US011358878B2

(12) United States Patent
Mitchell, Jr.

(10) Patent No.: US 11,358,878 B2
(45) Date of Patent: Jun. 14, 2022

(54) SYSTEMS AND METHODS FOR SEPARATING SOLUBLE SOLUTIONS

(71) Applicant: William H. Mitchell, Jr., Comanche, TX (US)

(72) Inventor: William H. Mitchell, Jr., Comanche, TX (US)

(\*) Notice: Subject to any disclaimer, the term of this patent is extended or adjusted under 35 U.S.C. 154(b) by 313 days.

(21) Appl. No.: 15/812,007

(22) Filed: Nov. 14, 2017

(65) Prior Publication Data

US 2018/0134579 A1 May 17, 2018

Related U.S. Application Data

(60) Provisional application No. 62/421,439, filed on Nov. 14, 2016.

(51) Int. Cl.
*B01D 9/04* (2006.01)
*C02F 1/22* (2006.01)
(Continued)

(52) U.S. Cl.
CPC ............... *C02F 1/22* (2013.01); *F25B 1/10* (2013.01); *F25B 25/005* (2013.01); *F25B 39/04* (2013.01); *F25B 40/06* (2013.01); *F25B 43/00* (2013.01); *F25B 49/027* (2013.01); *C02F 2103/08* (2013.01); *C02F 2103/10* (2013.01);
(Continued)

(58) Field of Classification Search
CPC ..... F25C 2301/002; B01D 9/04; B01D 9/004; B01D 9/0045; F25J 3/08; F25J 2200/38; F25J 2200/90; F25J 2205/20; F25J 2205/90; F25J 2220/80; F25J 3/0209; F25J 3/0223
See application file for complete search history.

(56) References Cited

U.S. PATENT DOCUMENTS 523,677 A 7/1894 McIntyre
658,726 A 9/1900 Naef
(Continued)

FOREIGN PATENT DOCUMENTS

EP 2203390 B1 4/2011
JP 55-145586 A 11/1980
(Continued)

OTHER PUBLICATIONS

International Search Report and Written Opinion dated Feb. 19, 2018 for Application No. PCT/US2017/061499 (16 pgs.).

*Primary Examiner* — Jianying C Atkisson
*Assistant Examiner* — Erik Mendoza-Wilkenfel
(74) *Attorney, Agent, or Firm* — Conley Rose, P.C.

(57) ABSTRACT

A system for separating a soluble solution includes a first freezer configured to receive a liquid feed stream and a refrigerant stream, and discharge a concentrated solution stream, wherein the first freezer is configured to exchange heat between the liquid feed stream and the refrigerant stream through direct contact within the first freezer and freeze a portion of the liquid feed stream, a first separator external to the first freezer and configured to separate ice particles from the concentrated solution stream and recirculate the concentrated solution stream to the first freezer, and a first ice washer coupled to the first separator and configured to receive the ice particles separated from the concentrated solution stream by the first separator and wash the separated ice particles to free the ice particles from contaminants.

30 Claims, 15 Drawing Sheets

(51) Int. Cl.
*F25B 40/06* (2006.01)
*F25B 25/00* (2006.01)
*F25B 1/10* (2006.01)
*F25B 43/00* (2006.01)
*F25B 39/04* (2006.01)
*F25B 49/02* (2006.01)
*C02F 103/10* (2006.01)
*C02F 103/36* (2006.01)
*C02F 103/08* (2006.01)

(52) U.S. Cl.
CPC .... *C02F 2103/365* (2013.01); *C02F 2303/08* (2013.01); *F25B 2400/072* (2013.01); *F25B 2400/12* (2013.01)

(56) References Cited

U.S. PATENT DOCUMENTS

| | | |
|---|---|---|
| 1,724,731 A | 8/1929 | Scholfeld |
| 1,941,951 A | 1/1934 | Muller et al. |
| 1,970,437 A | 8/1934 | Snitkin |
| 1,999,712 A | 4/1935 | Zorn et al. |
| 2,079,182 A | 5/1937 | Petty et al. |
| 2,101,953 A | 12/1937 | Oman |
| 2,503,695 A | 4/1950 | Webb et al. |
| 2,550,722 A | 5/1951 | Rollman |
| 2,821,304 A | 1/1958 | Zarchin |
| 2,904,511 A | 9/1959 | Donath |
| 2,968,164 A | 1/1961 | Hanson |
| 2,974,102 A | 3/1961 | Williams |
| 2,988,895 A | 6/1961 | Toulmin, Jr. |
| 3,024,117 A | 3/1962 | Barlow |
| 3,027,320 A | 5/1962 | Buchanan |
| 3,049,888 A | 8/1962 | Bosworth |
| 3,070,969 A | 1/1963 | Ashley et al. |
| 3,079,761 A | 3/1963 | Toulmin, Jr. |
| 3,098,735 A | 7/1963 | Clark |
| 3,121,626 A | 2/1964 | Zarchin |
| 3,126,334 A | 3/1964 | Harlow |
| 3,130,792 A | 4/1964 | Thomas |
| 3,132,096 A | 5/1964 | Walton |
| 3,154,395 A | 10/1964 | Stine et al. |
| 3,155,610 A | 11/1964 | Williams |
| 3,159,474 A | 12/1964 | Moloney |
| 3,170,779 A | 2/1965 | Kamofsky |
| 3,178,899 A | 4/1965 | Torobin et al. |
| 3,188,825 A | 6/1965 | Van Olphen |
| 3,193,361 A | 7/1965 | Niedner |
| 3,214,371 A | 10/1965 | Tuwiner |
| 3,243,966 A | 4/1966 | Glew |
| 3,250,081 A * | 5/1966 | Othmer .............. B01D 9/0009 62/535 |
| 3,251,192 A | 5/1966 | Rich et al. |
| 3,253,419 A | 5/1966 | Thomas |
| 3,266,263 A | 8/1966 | Pollock |
| 3,293,872 A | 12/1966 | Rowenkamp |
| 3,349,573 A | 10/1967 | Rowenkamp |
| 3,354,083 A | 11/1967 | Cheng |
| 3,364,690 A | 1/1968 | Torobin |
| 3,367,123 A | 2/1968 | Schambra |
| 3,371,035 A | 2/1968 | Jacobs et al. |
| 3,400,549 A * | 9/1968 | Karnofsky ............... F25C 1/00 62/535 |
| 3,404,536 A | 10/1968 | Aronson |
| 3,415,747 A | 12/1968 | Glew |
| 3,435,625 A | 4/1969 | Wiegandt |
| 3,442,801 A | 5/1969 | Anderson |
| 3,461,679 A | 8/1969 | Goldberger |
| 3,474,635 A | 10/1969 | Rowe, Jr. |
| 3,489,159 A | 1/1970 | Cheng et al. |
| 3,525,230 A * | 8/1970 | Smith ................. C02F 1/22 62/534 |
| 3,592,016 A | 7/1971 | Bligh |
| 3,605,426 A | 9/1971 | Chao et al. |
| 3,616,653 A * | 11/1971 | Othmer ................. B01D 9/04 62/535 |
| 3,665,033 A | 5/1972 | Ohlswager |
| 3,788,819 A | 1/1974 | Oden |
| 3,795,608 A | 3/1974 | Fujiyama et al. |
| 3,813,892 A * | 6/1974 | Johnson ................. C02F 1/22 62/535 |
| 3,856,492 A | 12/1974 | Klass |
| 4,031,707 A | 6/1977 | Ross et al. |
| 4,043,140 A | 8/1977 | Wendt et al. |
| 4,091,635 A * | 5/1978 | Ogman ............... B01D 9/0045 62/123 |
| 4,092,834 A | 6/1978 | Lloyd |
| 4,129,431 A | 12/1978 | Ross et al. |
| 4,129,583 A | 12/1978 | Zondek |
| 4,138,858 A | 2/1979 | Izumi |
| 4,153,555 A | 5/1979 | Acker et al. |
| 4,164,854 A | 8/1979 | Martin |
| 4,194,367 A * | 3/1980 | Lavik .................... F25B 47/022 62/138 |
| 4,252,549 A | 2/1981 | Chaunce et al. |
| 4,256,717 A | 3/1981 | Dawless |
| 4,327,059 A | 4/1982 | Fujimura et al. |
| 4,438,634 A | 3/1984 | Merle et al. |
| 4,952,750 A | 8/1990 | Puppel |
| 5,037,463 A * | 8/1991 | Engdahl ................. F26B 5/00 62/532 |
| 5,394,706 A | 3/1995 | Keus |
| 5,444,986 A | 8/1995 | Hino |
| 5,553,456 A | 9/1996 | McCormack |
| 5,873,262 A | 2/1999 | Max et al. |
| 6,158,239 A | 12/2000 | Max et al. |
| 6,336,334 B1 | 1/2002 | Minkkinen et al. |
| 6,363,743 B1 | 4/2002 | Jonassen et al. |
| 6,565,715 B1 | 5/2003 | Max |
| 7,485,234 B2 | 2/2009 | Max |
| 7,658,856 B2 | 2/2010 | de Strulle |
| 7,794,603 B2 | 9/2010 | Skejetne et al. |
| 7,856,843 B2 | 12/2010 | Enis et al. |
| 8,080,164 B2 | 12/2011 | de Strulle |
| 8,226,743 B2 | 7/2012 | Betting et al. |
| 8,365,432 B2 | 2/2013 | Morimoto |
| 2006/0086110 A1* | 4/2006 | Manole ................. F25B 1/10 62/175 |
| 2007/0220917 A1* | 9/2007 | Nohlen ............... F25J 3/04412 62/643 |
| 2016/0243488 A1 | 8/2016 | Wells et al. |

FOREIGN PATENT DOCUMENTS

| | | |
|---|---|---|
| JP | 56-073593 A | 6/1981 |
| JP | 01-160819 A | 6/1989 |
| JP | 06-055063 A | 3/1994 |

\* cited by examiner

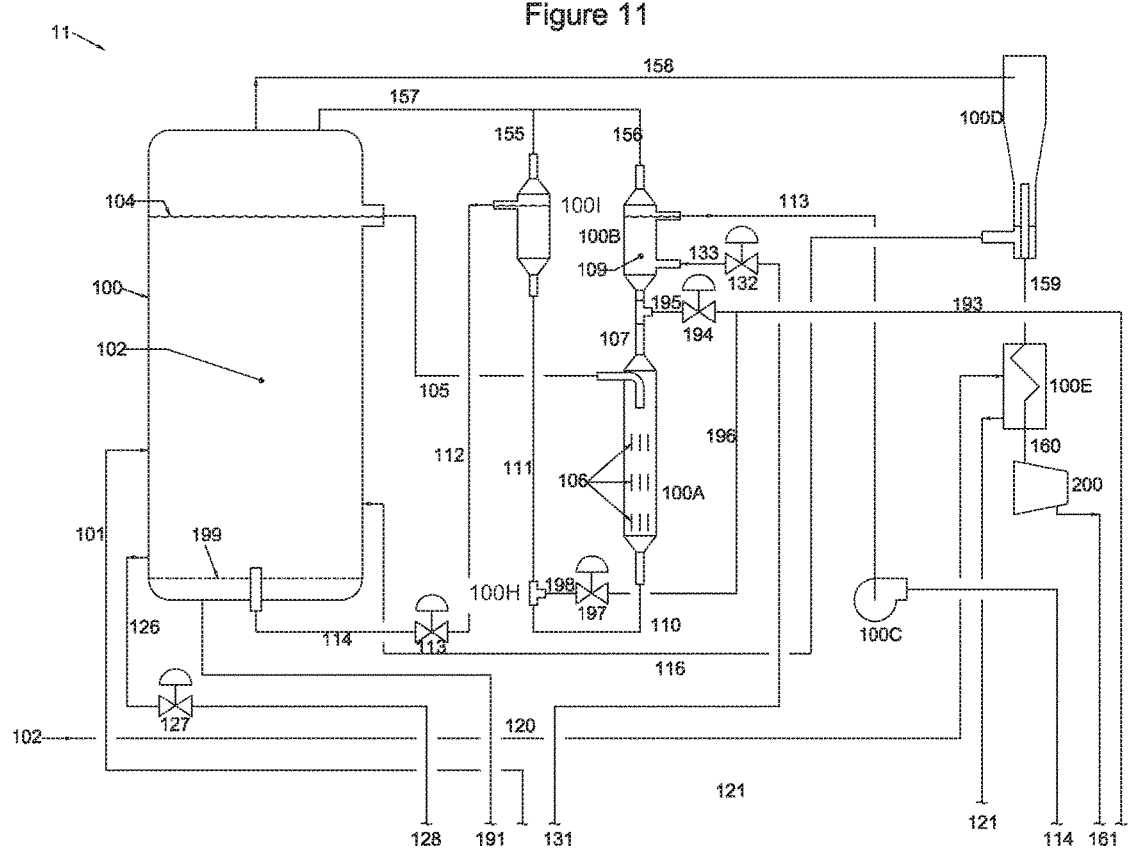
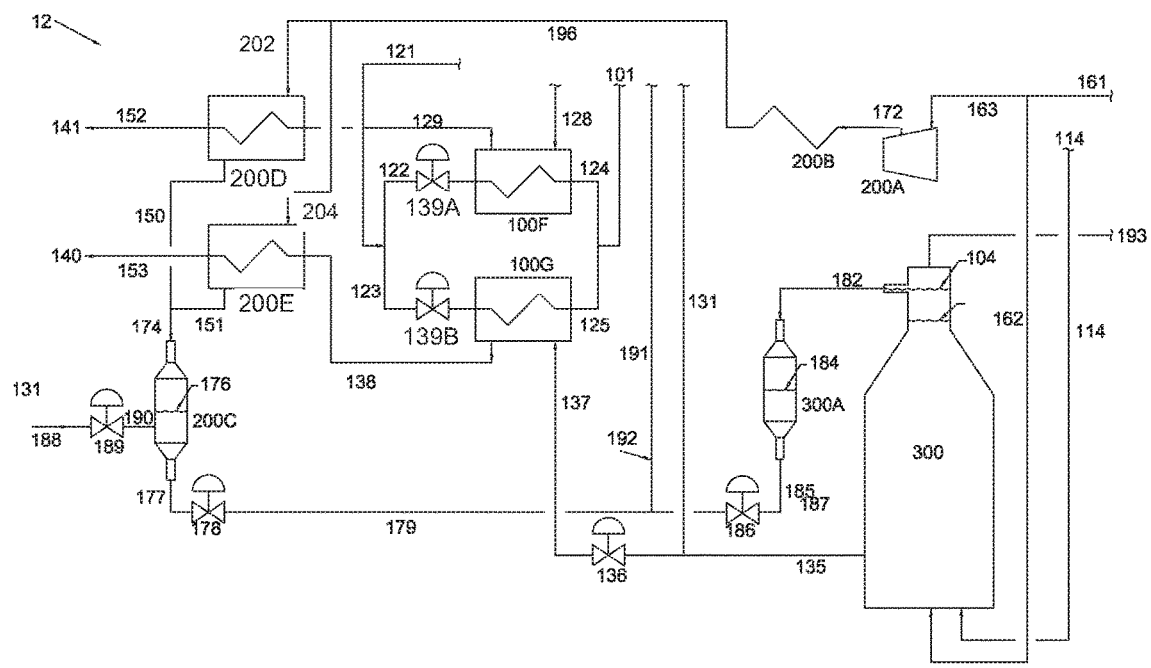

SYSTEMS AND METHODS FOR SEPARATING SOLUBLE SOLUTIONS

CROSS-REFERENCE TO RELATED APPLICATIONS

This application claims benefit of U.S. provisional patent application Ser. No. 62/421,439 filed Nov. 14, 2016, and entitled "Systems and Methods for Separating Soluble Solutions," which is hereby incorporated herein by reference in its entirety.

STATEMENT REGARDING FEDERALLY SPONSORED RESEARCH OR DEVELOPMENT

Not applicable.

BACKGROUND

Solutions are mixtures including a solute and a solvent, where the solute is dissolved in the solvent to form the mixture, and the concentration of the solute is a measure of the amount of solute dissolved in the solution. In some applications, such as concentrating fruit juices, desalinization seawater, etc., a solute dissolved in a solution may be at least partially separated therefrom via partially freezing the solution. For instance, when a solution is partially frozen, the solute typically remains mostly in the liquid phase of the solvent while the solid (frozen) phase of the solvent is largely free of the solute. In the context of desalinization of seawater, at least partial desalination may be achieved by partially freezing a quantity of the solvent water of the seawater solution. In this application, the process is typically terminated before all of the seawater is frozen. The solid ice is separated from the liquid concentrate and then melted to obtain desalinated water, while the salty concentrate is discarded. Refrigeration cycles employed in freeze concentration often heat pump thermal energy from the water to be frozen to the ice to be melted. Because of unavoidable process inefficiencies in such a process, the quantity of ice produced from the process is typically not sufficient to supply all the heat pump low temperature requirements; thus, it is normally necessary to pump some heat from the process to the surrounding environment.

BRIEF SUMMARY OF THE DISCLOSURE

An embodiment of a system for separating a soluble solution comprises a first freezer configured to receive a liquid feed stream and a refrigerant stream, and discharge a concentrated solution stream, wherein the first freezer is configured to exchange heat between the liquid feed stream and the refrigerant stream through direct contact within the first freezer and freeze a portion of the liquid feed stream, a first separator external to the first freezer and configured to separate ice particles from the concentrated solution stream and recirculate the concentrated solution stream to the first freezer, and a first ice washer coupled to the first separator and configured to receive the ice particles separated from the concentrated solution stream by the first separator and wash the separated ice particles to free the ice particles from contaminants. In some embodiments, the system further comprises a perforated plate disposed in the first freezer and configured to disperse the refrigerant stream into droplets within the first freezer with a plurality of holes extending through the perforated plate, each hole comprising a first aperture having a first diameter and a second aperture having a second diameter that is less than the first diameter. In some embodiments, the first separator comprises a plurality of vanes configured to provide a uniform velocity profile of the concentrated solution stream flowing therethrough. In certain embodiments, the first separator is configured to provide a downflow of liquid and first ice crystals of the concentrated solution stream and an upflow of second ice crystals of the concentrated solution stream, the second ice crystals each having a larger diameter than a diameter of each of the first ice crystals. In certain embodiments, the first ice washer is configured to mix the separated ice particles with water to form a slurry of water and ice. In some embodiments, the system further comprises a gas lift pump coupled between the first separator and the first freezer and configured to apply motive force for recirculating the concentrated solution stream from the first separator to the first freezer. In some embodiments, the gas lift pump comprises a T-connection configured to receive the concentrated solution stream from the first separator and a refrigerant vapor stream. In certain embodiments, the system further comprises a compressor configured to pressurize a refrigerant overhead stream discharged from the first freezer, and a condenser configured to receive a stream of water and ice slurry from the first ice washer and the refrigerant stream from the compressor, wherein the condenser comprises a slurry distribution grid and a refrigerant distribution grid, the refrigerant distribution grid being disposed above the slurry distribution grid, and a perforated plate disposed between the refrigerant distribution grid and the slurry distribution grid, wherein the slurry distribution grid, the refrigerant distribution grid, and the perforated plate are configured to mix the refrigerant stream and the water and ice slurry stream to condense the refrigerant stream and melt ice particles of the water and ice slurry stream. In certain embodiments, the system further comprises a compressor configured to pressurize a refrigerant overhead stream discharged from the first freezer, and a condenser configured to receive a stream of water and ice slurry from the first ice washer and the refrigerant stream from the compressor, wherein the condenser comprises a plurality of baffles configured to direct the refrigerant stream upward through the condenser along a serpentine path, direct the stream of water and ice slurry downward through perforations formed in the baffles, and bring the refrigerant stream into contact with the water and ice slurry stream to exchange heat and condense the refrigerant stream and melt ice particles of the water and ice slurry stream. In some embodiments, the system further comprises a compressor configured to pressurize a refrigerant overhead stream discharged from the first freezer, and a condenser configured to receive a stream of water and ice slurry from the first ice washer and the refrigerant stream from the compressor, wherein the condenser comprises a plurality of baffles configured to direct the refrigerant stream upward through the condenser along a serpentine path, direct the stream of water and ice slurry downward through the condenser along a serpentine path, and bring the refrigerant stream into contact with the water and ice slurry stream to exchange heat and condense the refrigerant stream and melt ice particles of the water and ice slurry stream. In some embodiments, the system further comprises a first compressor configured to pressurize a refrigerant overhead stream discharged from the first freezer, a condenser configured to receive a stream of water and ice slurry from the first ice washer and the refrigerant stream from the first compressor, wherein the condenser is configured to mix the refrigerant stream and the water and ice slurry stream to condense the refrigerant stream and melt ice particles of the water and ice slurry stream, a second compressor configured to receive the refrigerant stream from the first compressor, wherein the second compressor is configured to further increase the pressure of the refrigerant stream sufficiently to condense the refrigerant stream through heat exchange with the environment, and a first heat exchanger configured to exchange heat between the refrigerant stream received from the second compressor and the ambient environment. In certain embodiments, the system further comprises a second heat exchanger configured to exchange heat between the liquid feed stream and a reject concentrate stream discharged from the first freezer, and a third heat exchanger configured to exchange heat between the liquid feed stream and a water stream discharged from the condenser, a fourth heat exchanger configured to exchange heat between the reject concentrate stream received from the second heat exchanger and a portion of the refrigerant stream received from the first heat exchanger to condense the refrigerant stream, and a fifth heat exchanger configured to exchange heat between the water stream received from the third heat exchanger and a portion of the refrigerant stream received from the first heat exchanger, and condense the refrigerant. In some embodiments, the first freezer, the first separator, and the first ice washer comprise a first freezer unit, the system comprises a second freezer unit comprising a second freezer, a second separator, and a second ice washer, the second freezer unit configured to receive the concentrated solution stream from the first freezer unit, and the second freezer is configured to operate at a lower pressure than the first freezer.

An embodiment of a system for separating a soluble solution comprises a freezer configured to receive a liquid feed stream and a refrigerant stream, and discharge a concentrated solution stream and a refrigerant overhead stream with entrained liquid droplets of concentrate solution, and a centrifugal separator positioned external of the freezer and configured to separate entrained liquid droplets suspended in the refrigerant overhead stream through the application of centrifugal force to the suspended liquid droplets, and wherein the centrifugal separator is configured to recirculate the liquid separated from the refrigerant overhead stream to the freezer. In some embodiments, the system further comprises a compressor configured to pressurize the refrigerant overhead stream received from the centrifugal separator, and a condenser configured to condense the refrigerant overhead stream received from the compressor. In some embodiments, the freezer is configured to exchange heat between the liquid feed stream and refrigerant stream through direct contact within the freezer. In certain embodiments, the system further comprises an ice separator external to the freezer and configured to separate ice particles from the concentrated solution stream and recirculate a portion of the concentrated solution stream to the freezer, and an ice washer coupled to the ice separator and configured to receive the ice particles separated from the concentrated solution stream by the ice separator and wash the separated ice particles to free the ice particles from contaminants.

An embodiment of a system for separating a soluble solution comprises a freezer configured to receive a liquid feed stream and a refrigerant stream, and discharge a concentrated solution stream, a reject concentrate stream, and a refrigerant overhead stream, a compressor configured to pressurize the refrigerant overhead stream received from the freezer, a condenser configured to condense the refrigerant overhead stream received from the compressor and discharge a water stream, a first heat exchanger configured to exchange heat between the liquid feed stream and the water stream received from the condenser, and a second heat exchanger configured to exchange heat between the water stream received from the first heat exchanger and the refrigerant overhead stream received from the compressor. In some embodiments, the system further comprises a third heat exchanger configured to exchange heat between the liquid feed stream and a reject concentrate stream received from the freezer, and a fourth heat exchanger configured to exchange heat between the reject concentrate stream received from the third heat exchanger and the refrigerant overhead stream received from the compressor. In some embodiments, the freezer is configured to exchange heat between the liquid feed stream and refrigerant stream through direct contact within the freezer. In certain embodiments, the system further comprises a centrifugal separator positioned external of the freezer and configured to separate entrained liquid droplets suspended in the refrigerant overhead stream through the application of centrifugal force to the suspended liquid, and wherein the centrifugal separator is configured to recirculate the liquid separated from the refrigerant overhead stream to the freezer.

BRIEF DESCRIPTION OF THE FIGURES

For a detailed description of the disclosed embodiments included in the disclosure, reference will now be made to the accompanying figures in which:

FIG. 11 is a schematic illustration of another embodiment of a system for separating a soluble solution in accordance with principles disclosed herein;

FIG. 12 is a schematic illustration of another embodiment of a system for separating a soluble solution in accordance with principles disclosed herein;

DETAILED DESCRIPTION OF THE DISCLOSED EMBODIMENTS

Figure 1:
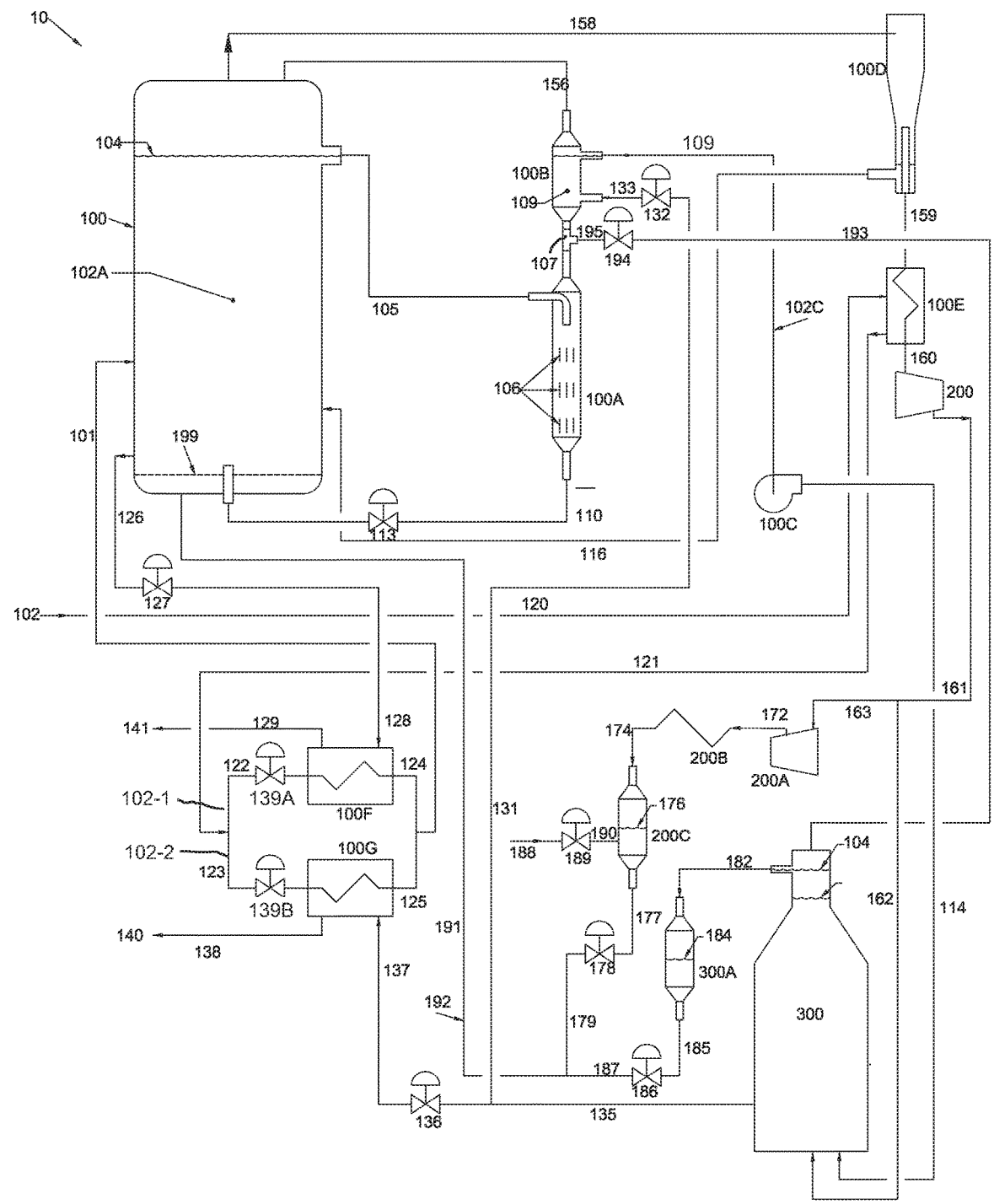
FIG. 1 is a schematic illustration of an embodiment of a system for separating a soluble solution in accordance with principles disclosed herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

Embodiments of systems and methods for separating soluble solutions are shown and described herein. In some embodiments, systems described herein are configured to reduce the amount of energy and/or power required to achieve separation of dissolved solutes from the solvent of a solution. In some embodiments, systems described herein are configured to maximize growth of ice crystals in order to facilitate separation of the crystals from the liquid with concentrated dissolved solutes (the concentrate), and subsequent washing of the crystals.

In certain embodiments, systems for separating soluble solutions described herein are configured to minimize the presence of appurtenances inside a freezer of the system, including but not limited to, vessel partitions, stirring impellers, and piping for distribution and collection of fluids, so as to thereby minimize accumulation of ice which would interfere with a freezing process. In certain embodiments, systems described herein are configured to minimize the size of freezer and condenser vessels of the system so that a portable separation plant of the system may be dispatched by truck, rail, ship, or barge to sites where separation capabilities are temporarily desired. In certain embodiments, systems described herein are configured to minimize the number of pumps of the system needed to transport slurry from one vessel to another of the system for the dual purpose of minimizing capital costs and minimizing the crushing and breaking of ice crystals. In this disclosure, the term "condenser" refers to a heat exchanger which not only condenses refrigerant but is also configured to melt ice.

Referring to FIG. 1, an embodiment of a system 10 for separating soluble solutions is shown. In the embodiment of FIG. 1, system 10 removes dissolved solutes, primarily NaCl, from oil field produced water and fracking flowback. However, system 10 may be employed in other applications for separating soluble solutions other than solutions including NaCl. Particularly, embodiments of systems for separating soluble solutions described herein may be employed with respect to any combination of solvent and solute which may by separated by cooling the solution until a solid of solvent or solute is formed.

Figure 2:
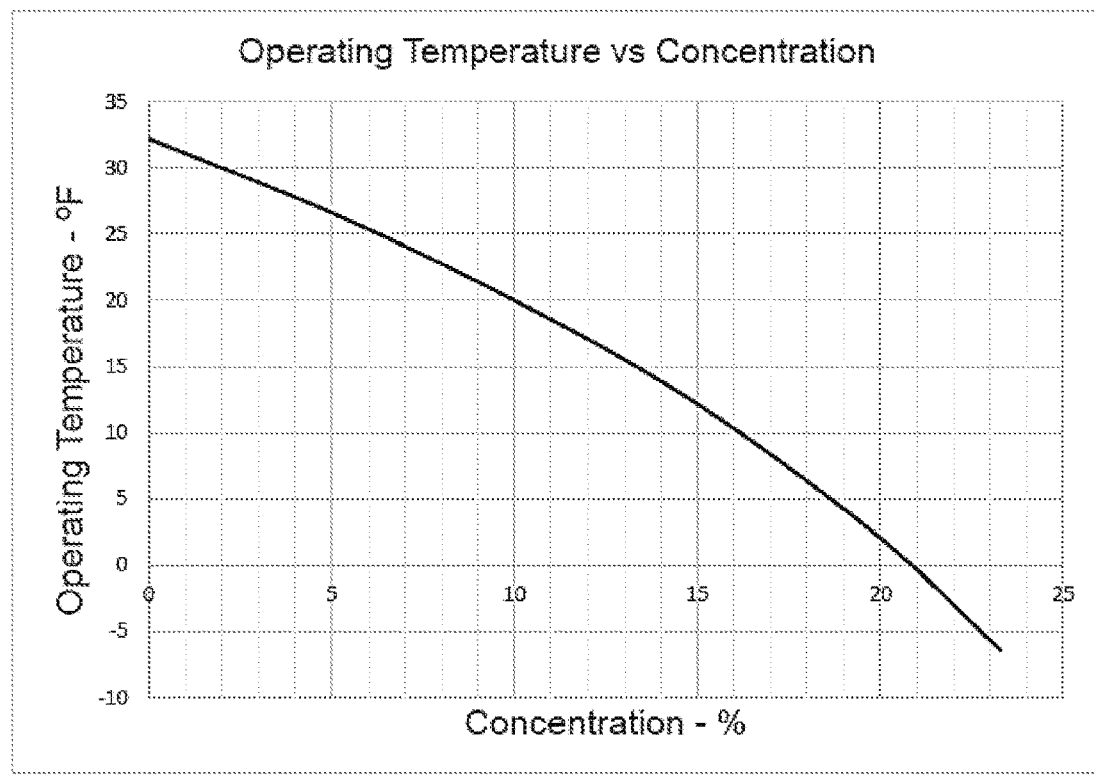
FIG. 2 is a chart illustrating a relationship between freeze point temperature and salt concentration in accordance with principles disclosed herein.
Figure 3:
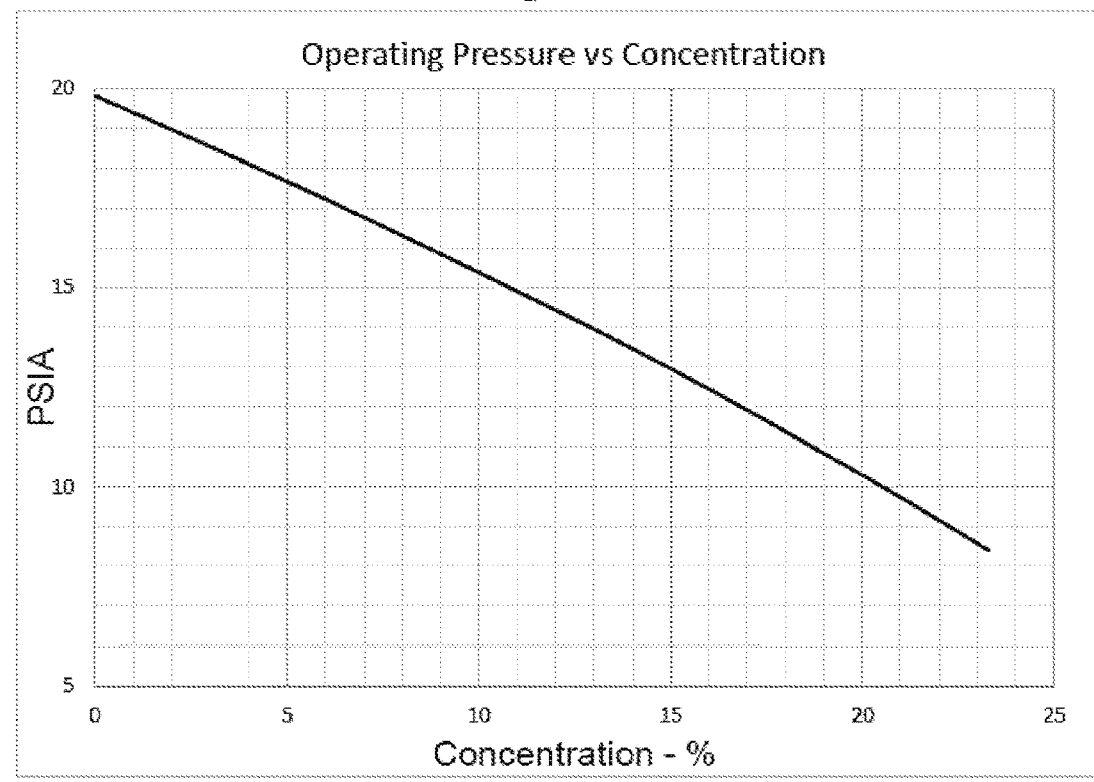
FIG. 3 is a chart illustrating a relationship between refrigerant pressure and salt concentration in accordance with principles disclosed herein.

Referring to FIGS. 2, 3, not intending to be bound by any particular theory, the freezing temperature of a liquid solution generally decreases as the solutes of the liquid solution become more concentrated, as shown in FIG. 2. Particularly, as solvent in the liquid solution gradually freezes, solvent (in this embodiment, water) is removed while the solute remains in the reduced quantity of liquid solution, resulting in a gradual increase in the concentration of solutes in the remaining liquid solution. Additionally, the operating temperature of a freezer is generally determined by the concentration of solutes in the solution in the freezer at any given time. In this embodiment, a 70/30 mixture of Isobutane and Butane is used as a refrigerant, causing a lower operating temperature of the freezer to result in a lower operating pressure, as shown in FIG. 3. The concentration of solutes in the liquid solution may thus determine the temperature and operating pressure of the freezer. For instance, in the embodiment of FIG. 1, given an effluent stream concentration of 10.0%, freezer 100 operates at a temperature of 20° F., and at 15.4 pounds per square inch absolute (psia).

Referring again to FIG. 1, system 10 separates a feed stream 102 into a first or separated effluent stream 140 and a second or concentrate effluent stream 141. In some embodiments: feed stream 102 of system 10 comprises water with 3.5% NaCl (table salt); separated effluent stream 140 comprises fresh water, having a mass flow rate equal to approximately 67% of the mass flow rate of feed stream 102; and the concentrate effluent stream 141 contains the majority of salt included in feed stream 102, where concentrate effluent stream 141 has a mass flow rate equal to approximately 33% of the mass flow rate of feed stream 102. In this embodiment, the concentrate effluent stream 141 has an NaCl concentration of approximately 10.5%. However, in other embodiments, feed stream 102 may comprise various solutions and concentrate effluent stream 141 may have various solute concentrations relative to feed stream 102. The term "fresh water" as used herein may include water comprising some amount of salt. Generally, in freeze concentration processes, a small amount of solute may remain in the separated solvent effluent stream. In this embodiment, the water comprising separated effluent stream 140 may be potable in at least some applications, containing about 0.5% of salt or less; however, salt concentration of the water comprising separated effluent stream 140 may vary in other embodiments.

In this embodiment, feed stream 102 is eventually fed to a freezer 100 of system 10 as a liquid and in freezer 100 becomes concentrated or liquid solution stream 102A. Systems for separating soluble solutions described herein are generally configured to favor the production of larger ice crystals, given that smaller sized crystals may more difficult to separate from solution and to wash in at least some applications. Additionally, cooling of the liquid solution 102A at a controlled rate, to keep subcooling at approximately 0.5° C. or less, may promote the growth of smaller ice crystals into larger ones, rather than spawning the creation of more numerous smaller seed crystals. Thus, in this embodiment, pressure inside freezer 100 is controlled to keep subcooling of liquid solution 102A to approximately 0.5° C. or less.

In this embodiment, freezer 100 comprises a direct-contact freezer 100. Additionally, in the embodiment, a refrigerant stream 192 that is mostly in the liquid phase with some vapor phase is also admitted into freezer 100 through a conduit 191. Once entering freezer 100, refrigerant stream 192 flows through a perforated plate 199 disposed in freezer 100 which disperses refrigerant stream 192 into droplets within freezer 100. In this embodiment, the refrigerant comprising refrigerant stream 192 is lighter than liquid solution 102A, and thus, being buoyant relative to liquid solution 102A, rises upwards through freezer 100. As the refrigerant droplets mix with the liquid solution 102A in freezer 100, the liquid in the refrigerant droplets expands into a vapor, cooling the refrigerant vapor which absorbs heat from the liquid solution 102A in freezer 100. In this embodiment, at some point, all of the liquid refrigerant in each droplet expands into a vapor in freezer 100. The refrigerant vapor rises through liquid solution 102A in freezer 100 until it emerges at a surface 104 of liquid solution 102A, where the refrigerant vapor provides agitation to prevent floating ice crystals in liquid solution 102A from agglomerating into a non-flowable mass. After reaching the surface 104 of liquid solution 102A, the refrigerant vapor exits through conduit 158 extending from an upper end or top of freezer 100.

The diameter of each perforation or hole formed in the perforated plate 199 of freezer 100 may determine the size or diameter of the mixed-phase refrigerant droplets rising through the liquid solution 102A disposed in freezer 100. In turn, the size of the mixed-phase refrigerant droplets may determine the heat transfer rate and the rise distance in freezer 100 required to absorb the quantity of heat necessary to change the remaining liquid phase refrigerant of the mixed-phase refrigerant droplets to the vapor phase. A lower heat transfer rate and longer rise distance resulting from larger diameter refrigerant droplets may be advantageous in promoting larger ice crystals that are relatively easier to separate from solution and wash. For instance, in some embodiments, a 0.125" hole size in perforated plate 199 is calculated to result in a heat transfer rate approximately ⅓ less that a 0.040" hole size. Additionally, in this embodiment, the holes of perforated plate 199 are sized to be small enough to maintain a minimum pressure drop to prevent liquid solution 102A from seeping beneath perforated plate 199, which may result in the formation of ice in a location in freezer 100 which could interfere with the process. Further, the holes of perforated plate 199 are sized to be large enough to produce refrigerant droplets of a size sufficient to transfer heat at a desired rate and promote the formation of relatively larger ice crystals.

Figure 5:
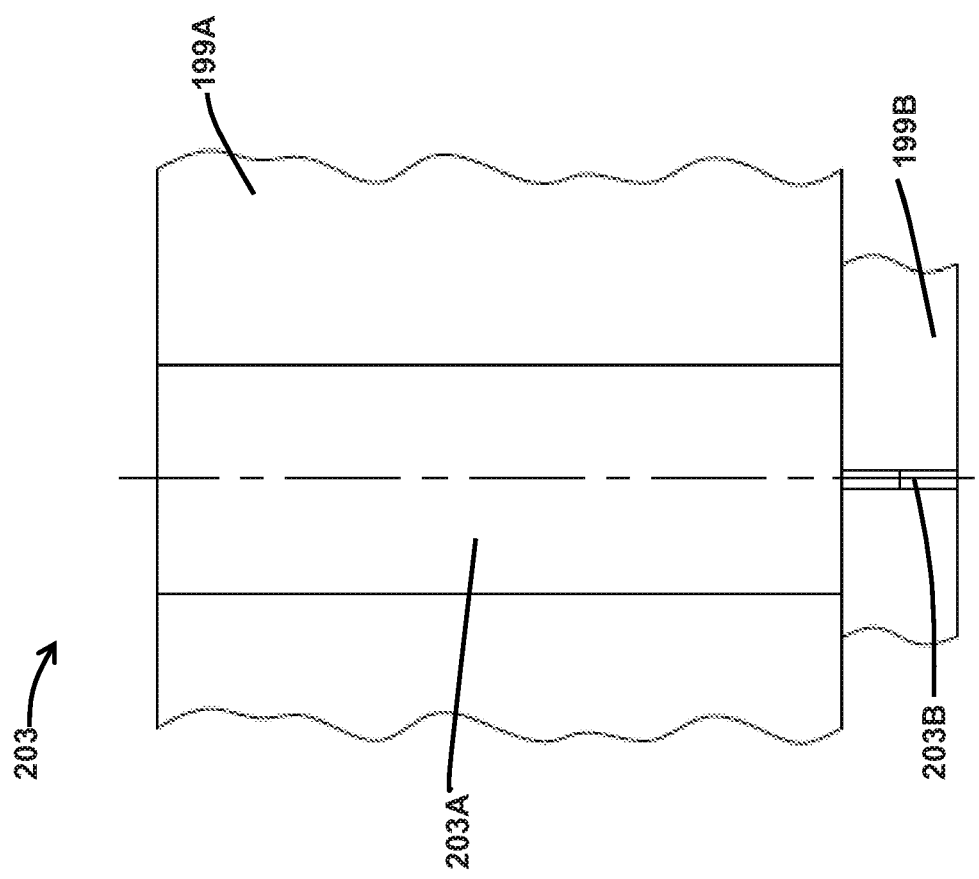
FIG. 5 is a side cross-sectional view of another embodiment of a perforated plate of a freezer of the system of FIG. 1 in accordance with principles disclosed herein.
Figure 4:
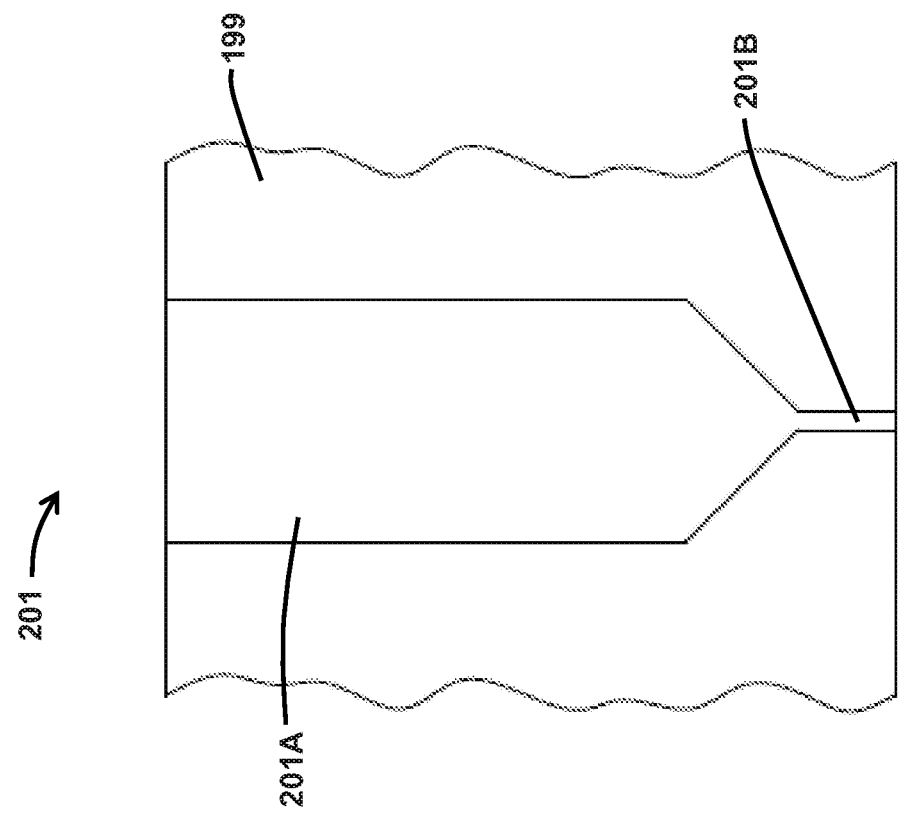
FIG. 4 is a side cross-sectional view of an embodiment of a perforated plate of a freezer of the system of FIG. 1 in accordance with principles disclosed herein.

Referring to FIGS. 4, 5, a first embodiment of the plurality of holes or perforations 201 of the perforated plate 199 of freezer 100 is shown in FIG. 4 while a second embodiment of one of the plurality of holes or perforations 203 of the perforated plate 199 of freezer 100 is shown in FIG. 5. In the embodiment of FIG. 4, holes 201 each comprise two coaxially extending apertures 201A, 201B formed in perforated plate 199, where, in this embodiment, perforated plate is approximately ⅜" thick. In this embodiment, the aperture 201A of each hole 201 has approximately a 0.010" diameter while aperture 201B has a larger, approximately 0.125" diameter. With aperture 201A having a smaller diameter than aperture 201B, aperture 201A provides a flow restriction to achieve desired or predetermined pressure drop across hole 201, while aperture 201B provides for near-spherical refrigerant liquid droplets with diameter approximately equal to the hole diameter to issue into the liquid solution 102A. In the embodiment of FIG. 5, each hole 203 of perforated plate 199 also includes a first, larger aperture 203A extending coaxially with a second, smaller aperture 203B. However, in this embodiment, perforated plate 199 comprises a first plate 199A through which first aperture 203A extends and a second plate 199B through which second aperture 203B extends, where second plate 199B is coupled to first plate 199A. The embodiments of holes 201, 203 shown in FIGS. 4, 5 represent examples of the holes extending through the perforated plate 199 of freezer 100, and thus, the size and geometry of the holes of perforated plate 199 may vary in other embodiments. Additionally, in some embodiments, the perforated plate 199 is made of a plastic material such as Polyvinyl chloride (PVC), and an upper surface or top of perforated plate 199 may be coated with a non-stick coating or made from a non-stick material to prevent ice from adhering to the surface and interfering with the process.

Referring again to FIG. 1, given that the density of ice disposed in freezer 100 is less than that of the liquid solution 102A, the ice crystals rise through the liquid solution 102A in freezer 100. Additionally, larger ice crystals rise at a greater velocity than smaller ice crystals. In other words, the smaller ice crystals comprise first ice crystals of the liquid solution 102A while the larger ice crystals comprise second ice crystals of the liquid solution 102A, where a diameter of each second ice crystal is greater than a diameter of each first ice crystal. In an embodiment, a 0.5 millimeter (mm) diameter crystal may rise through liquid solution 102A at 0.5 centimeters per second (cm/sec), while a 1 mm crystal may rise at 1.3 cm/sec through liquid solution 102A. In this embodiment, ice crystals disposed in freezer 100 eventually rise to the surface 104 of liquid solution 102A. Once the ice crystals reach the surface 104 of liquid solution 102A, the ice crystals, along with some of the liquid solution 102A, are withdrawn from freezer 100 through a conduit 105 and into a first or ice separator 100A. At least a portion of the liquid solution 102A entering separator 100A via conduit 105 is returned to freezer 100 at a location proximal a lower end of freezer 100 via a conduit 110 extending between a lower end of separator 100A and freezer 100. In this configuration, a circulation loop for circulating liquid solution 102A through freezer 100 is formed that comprises separator 100A and conduits 105, 110.

Figure 7:
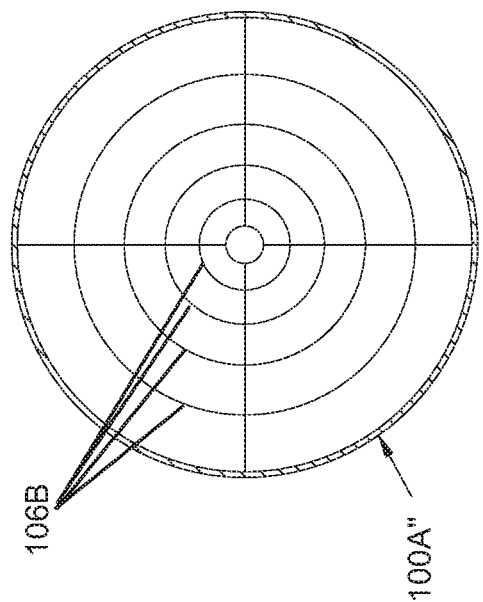
FIG. 7 is a side cross-sectional view of another embodiment of a separator of the system of FIG. 1 in accordance with the principles disclosed herein.
Figure 6:
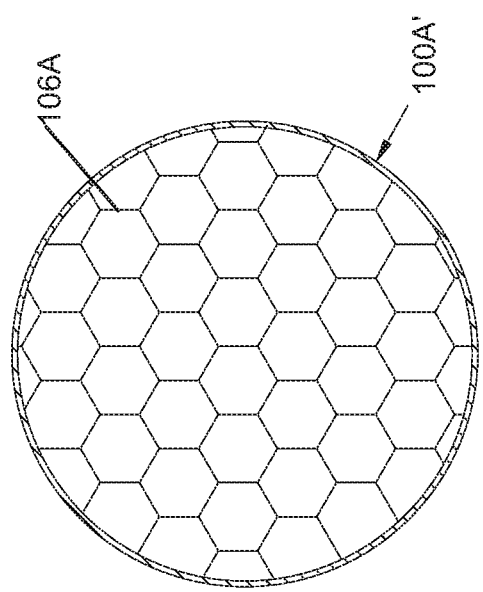
FIG. 6 is a side cross-sectional view of an embodiment of a separator of the system of FIG. 1 in accordance with the principles disclosed herein.

In this embodiment, a first vertical column of liquid solution 102A is formed in freezer 100 while a second vertical column of liquid solution 102A is formed in conduit 105 and separator 100A, where the first column of liquid solution 102A formed in freezer 100 includes refrigerant vapor bubbles rising therethrough from the refrigerant stream 192. Due to the presence of refrigerant vapor bubbles, the density of the first column of liquid solution 102A formed in freezer 100 is less than the density of the second column of liquid solution 102A formed in conduit 105 and separator 100A. In this embodiment, a motive force or pressure for circulating liquid solution 102A through freezer 100, conduit 105, and separator 100A is provided by the difference in density between the first and second columns of liquid solution 102A. In this embodiment, the flow rate and therefore velocity of the liquid solution 102A flowing through separator 100A is controlled by a valve 113 coupled to conduit 110 to ensure that the downward velocity of the liquid solution 102A in separator 100A is less than the rise velocity of ice crystals 1 mm diameter and greater, and that the flow of liquid solution 102A in separator 100A is laminar. Those skilled in the art will understand that fluid velocity is typically greatest at the centerline of a cylindrical conduit, is typically 0 (zero) at the inner surface of the conduit, and the velocity profile of the fluid flow across the cross section of the conduit is parabolic for laminar flow. In this embodiment, to promote a more uniform velocity profile of liquid solution 102A across the cross section of separator 100A, plural sets of vanes 106 are included in separator 100A. The geometry and distribution of vanes 106 in separator 100A may vary in different embodiments of separator 100A. For instance, referring briefly to FIGS. 6, 7, a first embodiment of vanes 106A of a fluid separator 100A' are shown in FIG. 6 while a second embodiment of vanes 106B of a fluid separator 100A" is shown in FIG. 7.

Referring again to FIG. 1, in the embodiment, winnowing of the larger crystals formed in liquid solution 102A from the smaller crystals formed therein is achieved by creating a downflow in the separator 100A at a flow velocity sufficient to entrain the smaller crystals in the downflow while allowing the larger crystals to rise or upflow into a conduit 107 that extends from an upper end of separator 100A, and from conduit 107 into an ice washer 100B coupled to conduit 107. Smaller ice crystals entrained in the stream of liquid solution 102A return from separator 100A through conduit 110, and valve 113 to the freezer 100, where the relatively small ice crystals may continue to grow in size therein. In this embodiment, ice crystals having a diameter greater than approximately 1 mm rise into the upper section of ice separator 100A, flow through conduit 107, and are received by ice washer 100B; however, in other embodiments, the size of ice crystals permitted to flow into ice washer 100B may vary. As the ice crystals flow through ice washer 100B, liquid solution 102A as well as any suspended solids and suspended hydrocarbons entrained in the flow of ice crystals are rinsed off by fresh water disposed in ice washer 1008 and carried back into the separator 100A by a fresh water purge flowing from ice washer 100B via conduit 107. Additionally, a relatively small amount of refrigerant vapor is admitted to an upper section of conduit 107 via a conduit 195 to provide bubbling agitation in ice washer 100B, preventing agglomeration of the ice crystals disposed in the upper section of ice washer 100B. The refrigerant vapor flowing into conduit 107 via conduit 195 is provided by the overhead of a condenser 300 of system 10. Particularly, the refrigerant vapor flows from condenser 300 into an overhead conduit 193, from conduit 193 through a valve 194 and into conduit 195, where the flow rate of refrigerant vapor entering conduit 107 from conduit 195 is controlled by valve 194. Other embodiments may utilize sources of refrigerant vapor other than the overhead of the condenser.

In this embodiment, the inflows and outflows of ice and fresh water to/from ice washer 100B are balanced to maintain a small net outflow, or purge, of fresh water from ice washer 100B to separator 100A via conduit 107. Conduit 107 has a relatively small cross section and a relatively long length designed to minimize mixing between fresh water flowing from ice washer 100B and liquid solution 102A flowing from separator 100A. In this embodiment, inflows to ice washer 100B comprise: ice crystals rising through conduit 107 into a lower end of ice washer 100B; and fresh water produced by condenser 300 and delivered to ice washer 100B via a conduit 131, a valve 132 coupled to conduit 131, and a conduit 133 extending between valve 132 and ice washer 100B. In this embodiment, outflows from ice washer 100B comprise: ice/water slurry exiting ice washer 100B via a conduit 109 to a pump 100C of system 10; and a small purge of fresh water received by conduit 107. Valve 132 controls the flow rate of fresh water into ice washer 100B via conduit 133 to maintain the purge of fresh water flowing through conduit 107 based on measurement of conductivity of the liquid in conduit 107.

In this embodiment, ice floating to the top of ice washer 100B, along with a portion of the fresh water in ice washer 100B, is drawn out as ice/water slurry through conduit 109. The ice-water slurry received by conduit 109 is pumped by pump 100C into condenser 300 via a conduit 114 extending between pump 100C and condenser 300. The vapor in ice washer 100B is separated from liquid disposed therein, and vented to freezer 100 via an overhead vent conduit 156 extending between the upper end of ice washer 100B and freezer 100. Additionally, as described above, refrigerant vapor is discharged from freezer 100 through conduit 158, where the refrigerant vapor flows into a centrifugal separator 100D of system 10. Centrifugal separator 100D removes liquid mist suspended in the refrigerant vapor stream received from freezer 100 via the application of a centrifugal force to the liquid mist to minimize corrosion in compressors of system 10 located downstream from centrifugal separator 100D. In this embodiment a centrifugal separator is utilized in lieu of other separators such as filters and coalescing separators because of the likelihood of ice formation. Particularly, with a centrifugal separator (e.g., centrifugal separator 100D), the insulation of the centrifugal separator can be designed to minimize heat absorption from the environment while allowing the inner wall temperature to remain above freezing. In this embodiment, liquids captured in centrifugal separator 100D are returned to freezer 100 through a conduit 116 extending from centrifugal separator 100D.

In this embodiment, dry refrigerant vapor passes from the centrifugal separator 100D through a conduit 159 to a heat exchanger 100E of system 10. Heat exchanger 100E exchanges a relatively small amount of heat between the stream of dry refrigerant vapor and the feed stream 102 (e.g., enough to raise the temperature of the dry refrigerant vapor by 2-3 degrees ° F.), preventing the formation of liquid in the dry refrigerant vapor stream as it is received by a first stage compressor 200 of system 10. Particularly, dry refrigerant vapor flows from heat exchanger 100E to first stage compressor 200 via a conduit 160 extending therebetween. First stage compressor 200 raises the pressure of the refrigerant vapor enough to overcome the head pressure of ice/water slurry disposed in condenser 300 and condense the refrigerant at approximately 32 degrees ° F., the freezing temperature of water in the embodiment. In this embodiment, where the refrigerant comprises a 70/30 blend of isobutane/butane, the condensing pressure of first stage compressor 200 is approximately 20.4 psia (5.7 pounds per square inch gauge (psig)). In this embodiment, an approximate six foot vertical column of ice/water slurry is disposed in condenser 300, adding 2.6 psi in head pressure to be overcome by the required compressor discharge pressure, and an allowance for frictional line losses of 0.2 psi would bring the required discharge pressure to 23.2 psia (8.5 psig) in this embodiment; however, in other embodiments, the required discharge pressure of first stage compressor 200 may vary.

In this embodiment, first stage compressor 200 is driven by an induction motor or other driver operating within a narrow range of rotational speed. No provisions are made in this embodiment to control the volumetric flow, discharge pressure, suction pressure, or any other process variable by varying compressor speed or through control valves at the suction or discharge of the compressor. In this embodiment, first stage compressor 200 is essentially a constant volume compressor, with small changes in volumetric flow which may occur through small variations in process variables; however, in other embodiments, first stage compressor 200 may include provisions for controlling flow through first stage compressor 200.

The discharge from first stage compressor 200 flows through a conduit 161 and is then divided into two streams: a first discharge stream flows through a conduit 162 that conveys the compressed refrigerant vapor comprising the first discharge stream to condenser 300. In condenser 300, the compressed refrigerant vapor from the first discharge stream gives up heat to the ice/water slurry admitted to condenser 300 from conduit 114, as described above, and is condensed, thereby melting the ice of the ice/water slurry. In this embodiment, condensed refrigerant is drawn off from near the top of the condenser 300 via a conduit 182, and melted ice is drawn off as reclaimed water, or fresh water, at the bottom of condenser 300. Particularly, the melted ice is discharged from condenser 300 through a conduit 135 and a valve 136, which responds to discharge water from ice that has been melted. The reclaimed or fresh water then flows through a conduit 137 to a heat exchanger 100G of system 10. In this embodiment, condensed refrigerant is discharged from condenser 300 through conduit 182 to a reservoir 300A of system 10, where a small inventory of condensed refrigerant is retained in reservoir 300A and discharged through a conduit 185 and a valve 186 coupled thereto, where valve 186 controls liquid level in reservoir 300A. In this way, discharge of condensed refrigerant from condenser 300 occurs only when and in the quantity that refrigerant is condensed into a liquid.

In this embodiment, there may be an insufficient quantity of ice/water slurry to fully condense the refrigerant discharged from first stage compressor 200. To compensate for the potential shortfall of ice slurry, the portion of the discharge from first stage compressor 200 not condensed by condenser 300 is conveyed through conduit 163 to second stage compressor 200A. In this embodiment, second stage compressor 200A is driven by a variable speed motor (not shown in FIG. 1) which increases or decreases the speed of the compressor as necessary to hold the discharge pressure of first stage compressor 200 at the required pressure, which in this embodiment, is approximately 23.2 psia. However, other embodiments may rely on a suction valve or discharge valve in lieu of variable speed drive to control the flow through second stage compressor 200A. In other embodiments, second stage compressor 200A is omitted and first stage compressor 200 is configured to increase the refrigerant vapor pressure sufficiently to condense by rejecting heat to the environment and control the rate of flow.

Second stage compressor 200A of system 10 compresses the refrigerant vapor to a pressure sufficient for condensing, as determined by the media to which a downstream heat exchanger 200B of system 10 is rejecting heat. In this embodiment, the heat is rejected to ambient air at 90° F. from heat exchanger 200B. In this embodiment, heat exchanger 200B provides a 25° F. heat exchanger temperature spread, thereby providing the condensing temperature to 115° F. In this embodiment, using the example 70/30 isobutane/butane refrigerant as in the previous example, the compression provided by second stage compressor 200A is approximately 82.4 psia (67.7 psig) or above, or, allowing 1.0 psi for line losses, approximately 83.4 psia (68.7 psig).

In this embodiment, condensed refrigerant downstream of second stage compressor 200A and heat exchanger 200B is collected in a reservoir 200C of system 10. In this embodiment, small amounts of refrigerant may be lost as minute quantities of refrigerant leave the system dissolved in both the separated effluent stream 140 and the concentrate effluent stream 141. Refrigerant losses manifests as a decrease in the liquid level in reservoir 200C. In this embodiment, refrigerant makeup is provided via a valve 189 of system 10, which is supplied liquid refrigerant from storage (not shown in FIG. 1) through a conduit 188, where valve 189 supplies liquid refrigerant in response to low liquid level in reservoir 200C.

In this embodiment, liquid refrigerant is discharged from reservoir 200C through a conduit 177 and a valve 178 of system 10, where valve 178 maintains a desired operating pressure of freezer 100. From valve 178, liquid refrigerant flows through a conduit 179 to mix with the discharge flowing from valve 186 through conduit 187, forming a mixed stream 192 that flows through a conduit 191 to freezer 100. Pressure drops through valves 178 and 186 may flash a portion of the liquid refrigerant flowing therethrough into vapor, and thus, flow through conduits 179, 187, and 191 comprises a mixed phase fluid flow.

In this embodiment, the energy efficiency of system 10 is enhanced by removing heat from the incoming feed stream through heat exchange with the cold separated effluent stream 140 and the cold concentrate effluent stream 141. Particularly, incoming liquid feed stream 102 (comprising a liquid solution) laden with dissolved solids and/or other solute is first admitted through inlet conduit 120. In some embodiments, the feed stream 102 may be pre-treated to remove suspended solids and dissolved gases through processes known to those skilled in the art. The liquid feed stream 102 receives a small amount of chilling by exchanging heat in heat exchanger 100E, as described previously. Feed stream 102 then flows though conduit 121, and is divided into two streams: a first feed stream 102-1 flows from conduit 121 through conduit 122 and then a valve 139A to exchange heat with outgoing concentrate effluent 141 in heat exchanger 100F, while a second feed stream 102-2 flows from conduit 121 through conduit 123 and a valve 139B to exchange heat with the outgoing separated effluent stream 140 in heat exchanger 100G. Further, reject concentrate is drawn out of freezer 100 through conduit 126, then through valve 127, which controls flow to maintain freezer 100 operating temperature, which is in turn determined by the concentration of the liquid solution 102A in freezer 100, as previously described. From valve 127, the reject concentrate flows through conduit 128 to heat exchanger 100F. After absorbing heat from the first feed stream 102-1, the reject concentrate exits the heat exchanger through conduit 129 as concentrate effluent 141. Additionally, chilled reclaimed water enters heat exchanger 100G from conduit 137, and after absorbing heat from the second feed stream 102-2, the reclaimed water exits heat exchanger 100G through conduit 138 as separated effluent stream 140, or fresh water discharge, as described above.

In at least some applications, heat exchange may be accomplished more effectively if the flow rate of first feed stream 102-1 flowing through heat exchanger 100F is approximately equal to the flow rate of the reject concentrate through heat exchanger 100F, and if the flow rate of second feed stream 102-2 flowing through heat exchanger 100G is approximately equal to the flow rate of reclaimed water through heat exchanger 100G. Valves 139A and 139G control the flows of fluid to heat exchangers 100F, 100G to achieve the flow rates needed for most effective heat exchange. Chilled liquid solution 102A exits heat exchangers 100F, 100G through conduits 124, 125, and is recombined in a conduit 101 that supplies the liquid solution 102 to freezer 100.

Figure 8:
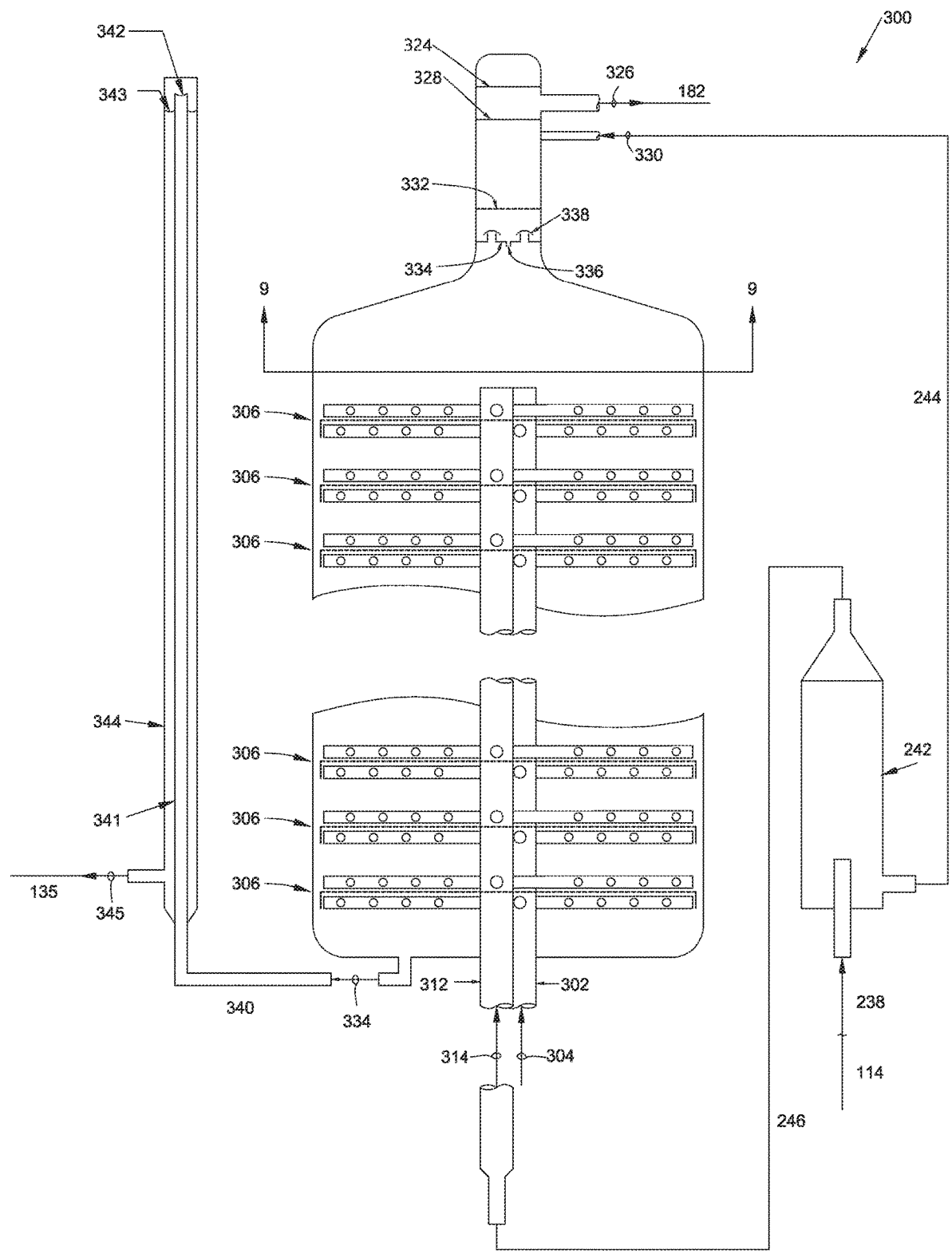
FIG. 8 is a side cross-sectional view of an embodiment of a condenser of the system of FIG. 1 in accordance with the principles disclosed herein.
Figure 9:
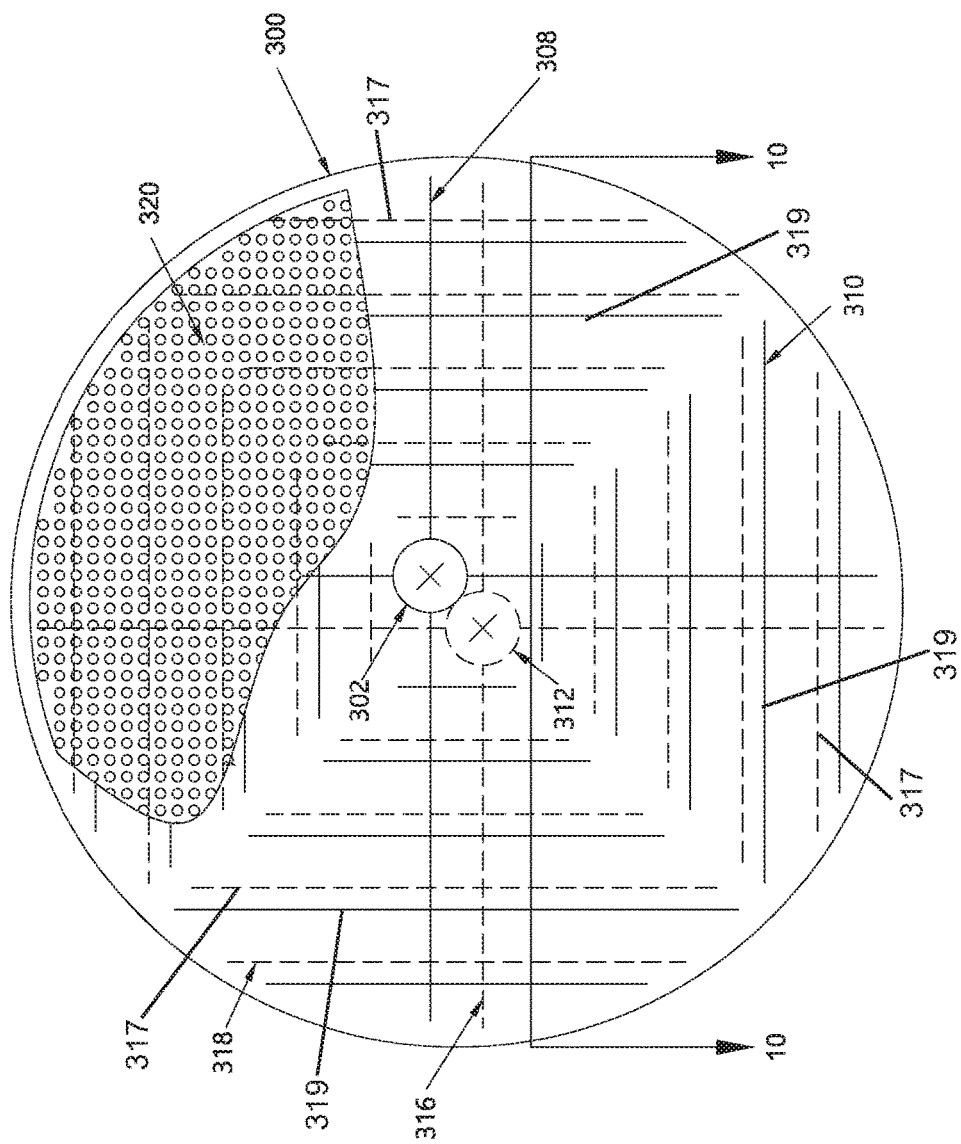
FIG. 9 is a top cross-sectional view along line 9-9 of FIG. 8 of the condenser of FIG. 8.
Figure 10:
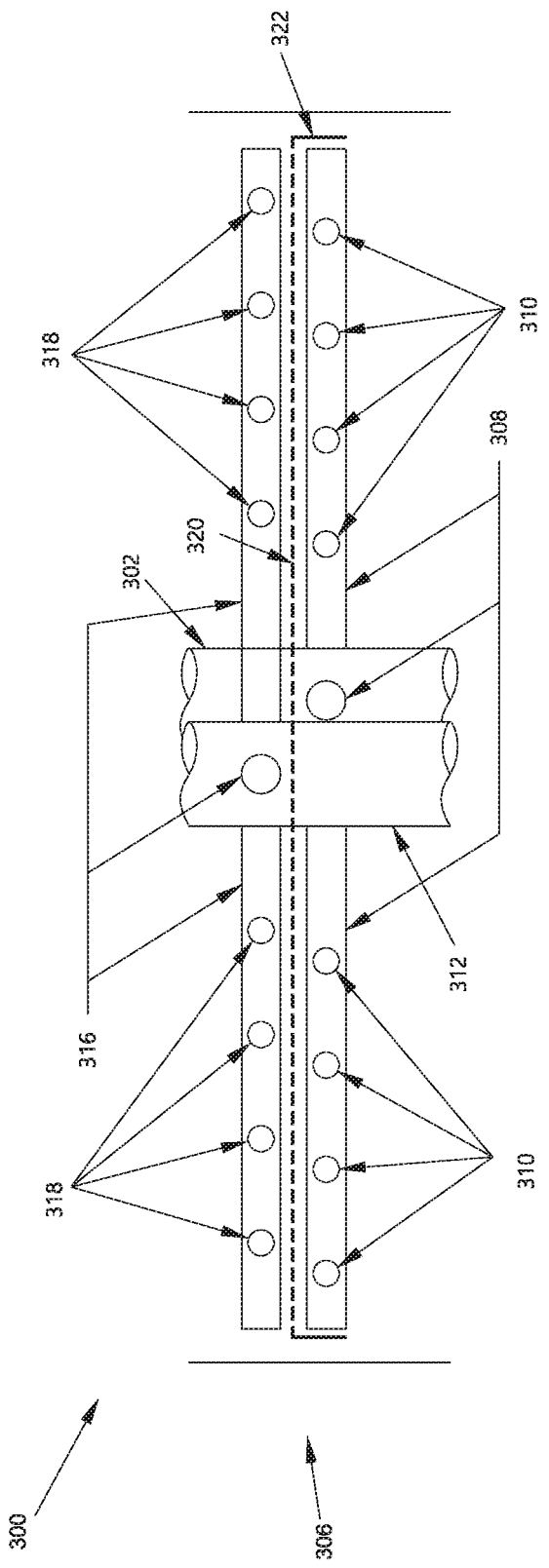
FIG. 10 is a side cross-sectional view along line 10-10 of FIG. 9 of the condenser of FIG. 8.

Referring to FIGS. 1 and 8-10, an embodiment of the condenser 300 of the system 10 of FIG. 1 is shown in FIGS. 8-10. The description of condenser 300 and the associated arrangement of risers, distribution headers, and distribution laterals which follows are exemplary, and alternative arrangements may be used to achieve uniform distribution of the slurry and refrigerant vapor other than the arrangements shown in FIGS. 8-10 and described below. In the embodiment shown in FIGS. 8-10, compressed refrigerant vapor is delivered to the condenser from compressor discharge header 161 and branch conduit 162 of system 10 connected therewith that extends to condenser 300. Refrigerant vapor enters a refrigerant riser 302 of condenser 300 at an entry point 304, and from riser 302 is delivered to a plurality of cells 306 (shown particularly in FIGS. 9, 10) of condenser 300. Within each cell 306 of condenser 300, refrigerant vapor is distributed to a plurality (e.g., four in an embodiment) of vapor distribution headers 308, and from distribution headers 308 to a plurality (e.g., 18 in an embodiment) of distribution laterals 310. In some embodiments, vapor is distributed through 5 mm holes, mainly in the distribution laterals 310, but with some holes in the vapor distribution headers 308 as needed to achieve uniform distribution. In this embodiment, an exemplary distribution of ice/water slurry (indicated by dashed lines 317) and an exemplary distribution of refrigerant (indicated by solid lines 319) are shown in FIG. 9.

In this embodiment, ice/water slurry from conduit 114 of system 10 enters a small separator 242 (shown in FIG. 8) configured to provide a small stream of ice-free cold water through a conduit 244 for purposes described below at an entry point 238 of separator 242. Ice/water slurry exits separator 242 and is transported through a conduit 246 to a slurry riser 312 extending vertically through condenser 300 at an entry point 314 of condenser 300. From slurry riser 312, the ice/water slurry is distributed to the plurality of cells 306 disposed in condenser 300. In this embodiment, within each cell 306, slurry is distributed to a plurality (e.g., four in an embodiment) of slurry distribution headers 316, and from distribution headers 316 to a plurality (e.g., 18 in an embodiment) of distribution laterals 318. In an embodiment, the slurry is distributed through 5 mm holes, mostly in the distribution laterals 318, but with some holes in the horizontal distribution headers 316 as needed to achieve uniform distribution.

In some embodiments, condenser 300 contains a mixture which is mostly fresh water at all times, mixed with some refrigerant vapor, refrigerant liquid, and ice. As the vapor is released into condenser 300, buoyancy causes the mixture to rise through condenser 300. On contact with the colder water, the vapor transfers heat to the water and thereby begins to condense from a vapor phase to a liquid phase. A perforated plate 320 (partially shown in FIG. 9) of each cell 306 comprises small holes configured to ensure that a) refrigerant bubbles emerging from the top of the perforated plate 320 are well-distributed, b) the bubbles have a small enough size to achieve a desired slow rate of rise, and c) the bubbles will condense into liquid droplets large enough to easily agglomerate with other liquid droplets and rise to the top of condenser 300. As shown particularly in FIG. 10, each cell 306 includes a skirt 322 extending around an underside of the perforated plate 320, skirt 322 being configured to prevent the refrigerant from bypassing the perforated plate 320 while allowing the flow of water into the space underneath perforated plate 320 to be unrestricted.

In some embodiments, ice/water slurry is released above the perforated plate 320 to ensure that the ice pellets, which may be as large as 2 mm, do not obstruct the holes formed in the perforated plate 320. Like the refrigerant, the ice is less dense than the water, and rises through condenser 300. Particularly, after absorbing heat from the vapor, the water transfers heat to the ice, causing the ice to melt. As the ice melts, the size of the ice pellets generally decrease and the rise rate of the ice through condenser 300. In some embodiments, the ice ultimately melts completely into water. The distance between the cells 306 is configured to allow the ice to melt before rising to the perforated plate 320 above, ensuring that the perforated plate 320 is not obstructed by ice pellets.

As the refrigerant bubbles condense to a liquid in condenser 300, the bubble size of the refrigerant generally decreases while the density of the refrigerant generally increases, causing the rate of rise of the refrigerant through condenser 300 to decrease, and thereby allowing residence time of the refrigerant to ensure that when difference in ice melting temperature and refrigerant condensing pressure is 0.3° C. or more (as an example), vapor bubbles fully condense to liquid droplets within 5 cm of the top of the perforated plate 320. Moreover, even if the refrigerant is not fully condensed, the refrigerant droplets rise through the perforated plates 320 above, eventually collecting below the surface 324 of the condensed refrigerant in a small neck at the top of condenser 300, where the condensed refrigerant is removed at a draw-off point 326 in condenser 300 and flows into conduit 182 of system 10.

In certain embodiments, accumulation of ice at an interface 328 formed in condenser 300 between refrigerant liquid and fresh water located therein may interfere with the operation of condenser 300. Thus, flow of refrigerant vapor and ice slurry into condenser 300 may be balanced in such a way that there is a very slight excess of refrigerant vapor, resulting in a space above the top cell 306 of condenser 300 where rising refrigerant droplets are mostly liquid, but with small amounts of vapor. Owing to the relatively high heat transfer coefficients associated with tiny droplets immersed in a liquid of different temperature, the temperature of the water in the space above the top cell 306 is at the refrigerant condensing temperature, which can be measured. In this embodiment, final condensation of all vapor in condenser 300 is achieved by admitting a small amount of chilled water from the previously described separator 242, through conduit 244 to a delivery point 330 of condenser 300 located just below the fresh water/liquid refrigerant interface 328.

In this embodiment, condenser 300 also comprises a perforated plate 332, a baffle 324 with a small aperture or hole 336 located near an upper end of condenser 300, and a plurality of bubble caps 338 to minimize the quantity of relatively dense cold water drifting downward through condenser 300 while also permitting the liquid refrigerant to rise to the top of condenser 300. In this embodiment, melted ice is drawn off the bottom of condenser 300 from a draw-off point 334 and discharged through a conduit 340 to a vertically extending riser 341 to maintain the level of the liquid refrigerant in condenser 300 at the correct elevation for discharge through draw-off point 326. In this arrangement, a portion of the water discharged to riser 341 spills over a weir at the top of riser 341, thereby maintaining head in condenser 300 at an elevation 342. In this embodiment, the water discharged from riser flows into a collection reservoir 344, and exits through discharge point 345 into conduit 135 of system 10. Because of the relatively high heat transfer coefficients achieved with small bubbles, small droplets, and small ice particles suspended in water, the embodiment of condenser 300 described above and shown in FIGS. 8-10 may perform the condensing and melting functions required by system 10 using a comparatively small vessel, thereby increasing the portability of system 10 as needed for some applications.

Referring to FIG. 11, another embodiment of a system 11 for separating soluble solutions is shown. System 11 includes features in common with system 10 shown in FIG. 1, and shared features are labeled similarly. Particularly, in applications where the geometry of the freezer 100, separator 100A, and connecting conduits of system 10 do not provide for sufficient flow to achieve the velocity required for separation of large ice crystals from small ones, a gas lift pump external to freezer 100 (as included in system 11) may be used to provide the motive pressure to achieve the necessary flow. In the embodiment of FIG. 11, conduit 110 of system 11 turns from horizontal to vertical, and has a gas lift pump or T-connection 100H for the admission of refrigerant vapor into the circulating stream of liquid solution 102A. Vapor is obtained from conduit 193, as described above with respect to system 10, and is routed through a conduit 196 to a valve 197 of system 11, where valve 197 controls the rate of vapor flow to achieve a desired rate of flow of liquid solution 102A. From valve 197, refrigerant vapor flows through a conduit 198 to connection 100H, where the vapor bubbles in the liquid stream 102A cause the stream 102A to rise through a conduit 111, to a separator 1001 of system 11. The vapor is separated from the liquid, and is vented through a conduit 155 to freezer overhead vent conduit 157. Liquid stream 102 flows by gravity from separator 1001 through conduit 112 to valve 113, thence through conduit 114 to freezer 100. In some embodiments of system 11, valve 113 may be omitted.

Referring to FIG. 12, another embodiment of a system 12 for separating soluble solutions is shown. System 12 includes features in common with system 10 shown in FIG. 1, and shared features are labeled similarly. Particularly, system 12 is similar to system 10 of FIG. 1 but includes additional heat exchangers 200D and 200E. As with system 10 described above, the refrigerant vapor discharge of second stage compressor 200A is cooled through heat exchange with ambient air in heat exchanger 200B, and then forwarded through conduit 196 to branch into conduits 202 and 204 of system 12. Conduit 202 conveys a first portion of the refrigerant vapor to heat exchanger 200D where it is chilled and condensed by concentrate effluent stream 141 and then discharged through a conduit 150 of system 12. Concentrate effluent stream 141 is conveyed from heat exchanger 100F through conduit 129, and after receiving heat in heat exchanger 200D, is discharged through a conduit 152 of system 12. A second or remaining portion of the refrigerant vapor is conveyed through conduit 204 to heat exchanger 200E, where it is chilled and condensed by separated effluent stream 140 and then discharged through conduit 151. Separated effluent stream 140 is conveyed from heat exchanger 100G through conduit 138, and after receiving heat in heat exchanger 200E, is discharged through a conduit 153 of system 12. The condensed refrigerant streams in conduits 150 and 151 join in conduit 174, and thence are handled in reservoir 200C, in the same way as in system 10.

In an alternate to the embodiment of system 12 shown in FIG. 12, heat exchanger 200B is eliminated and the compressed refrigerant vapors are conveyed from second stage compressor 200A directly to heat exchangers 200D and 200E. In the embodiment of FIG. 12, heat rejection to the ambient environment is accomplished through heat rejection or transfer to effluent fresh water and concentrate. In some embodiments, after heat exchange with incoming feed solution, the effluents may be cooler than available ambient sources, providing energy efficiencies when compared to traditional methods of transferring heat to the ambient environment through air coolers or to available bulk quantities of ambient water. In the embodiment of a system 12, freeze concentration rejecting heat mainly to effluents, with minimal heat rejection to ambient air, is calculated to use approximately 17% less energy than a comparable system rejecting heat to ambient air only. In some embodiments, the temperature of the effluent concentrate and fresh water on a 40° C. (104° F.) day will be in the vicinity of 45° C. (112° F.), although temperatures may vary depending on the application. For instance, in some applications such a temperature may not be tolerated; however, in other applications, where the effluent goes to tanks or holding ponds, the aforementioned temperature may be acceptable. In some embodiments, heat exchanger 1 comprises a first heat exchanger 200B, heat exchanger 100F comprises a second heat exchanger 100F, heat exchanger 100G comprises a third heat exchanger 100G, heat exchanger 200D comprises a fourth heat exchanger 200D, and heat exchanger 200E comprises a fifth heat exchanger 200E. In other embodiments, heat exchanger 100G comprises a first heat exchanger 100G, heat exchanger 200E comprises a second heat exchanger 200E, heat exchanger 100F comprises a third heat exchanger 100F, and heat exchanger 200D comprises a fourth heat exchanger 200D.

Figure 13:
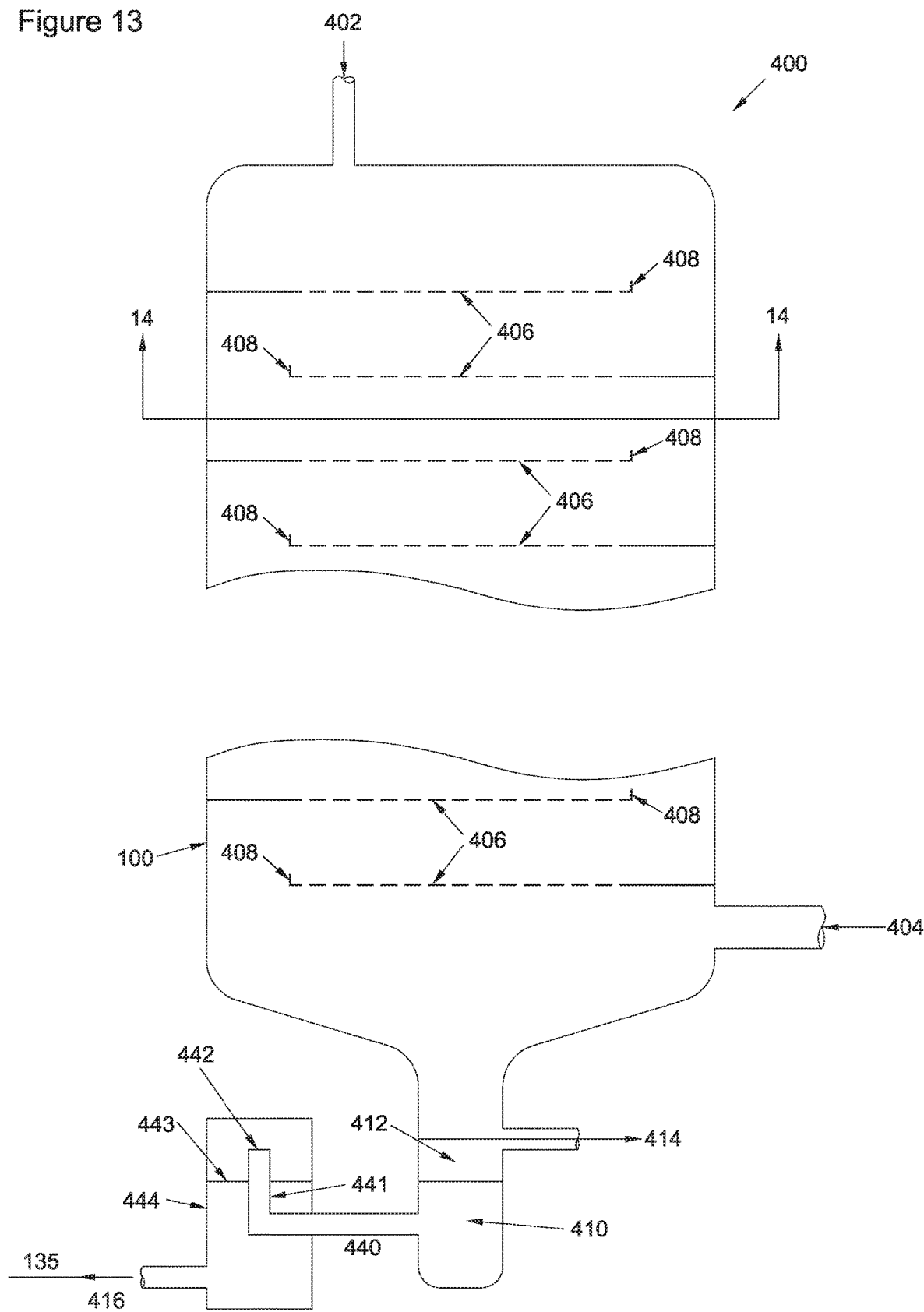
FIG. 13 is a side cross-sectional view of another embodiment of a condenser of the system of FIG. 1 in accordance with principles disclosed herein.
Figure 14:
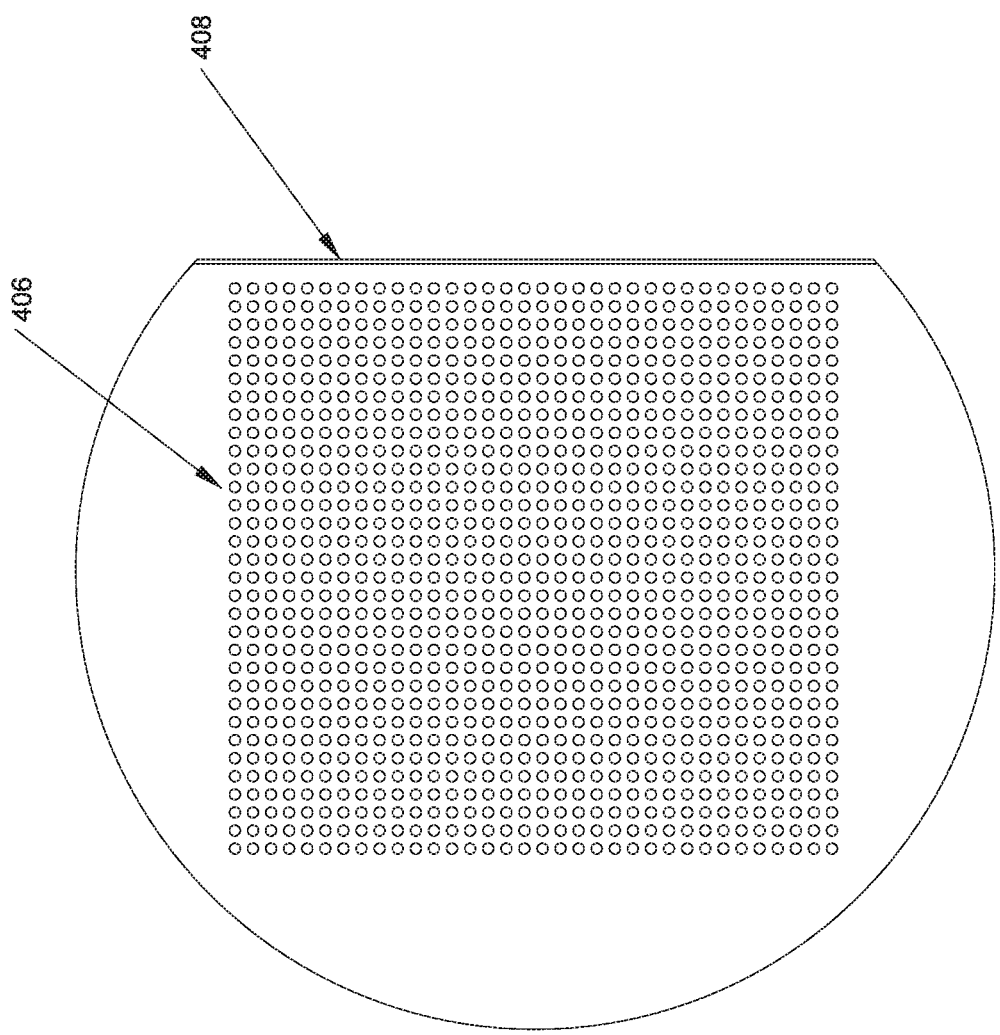
FIG. 14 is a cross-sectional view along line 14-14 of FIG. 13 of the condenser of FIG. 13.
Figure 15:
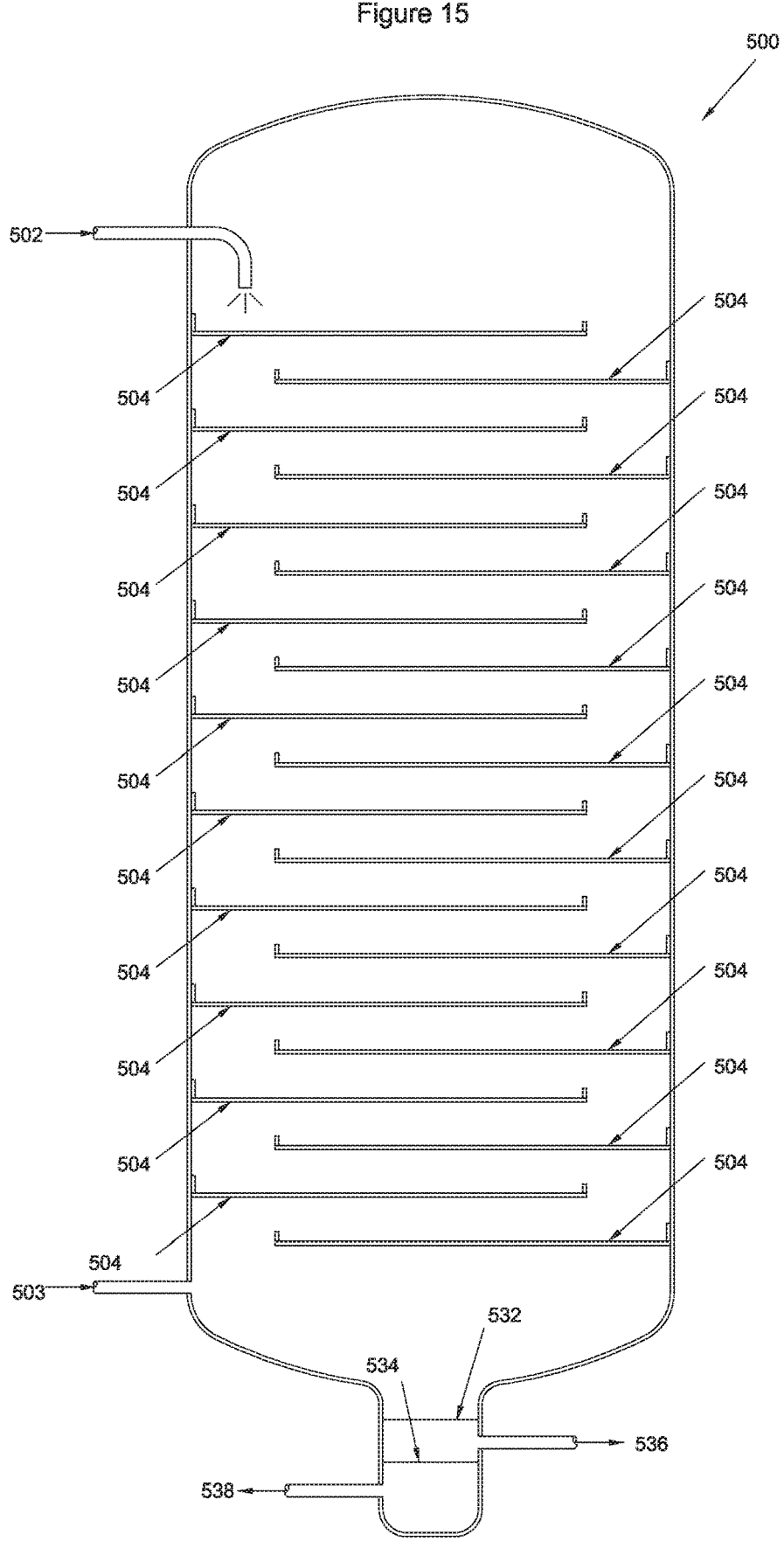
FIG. 15 is a side cross-sectional view of another embodiment of a condenser of the system of FIG. 1 in accordance with principles disclosed herein.
Figure 16:
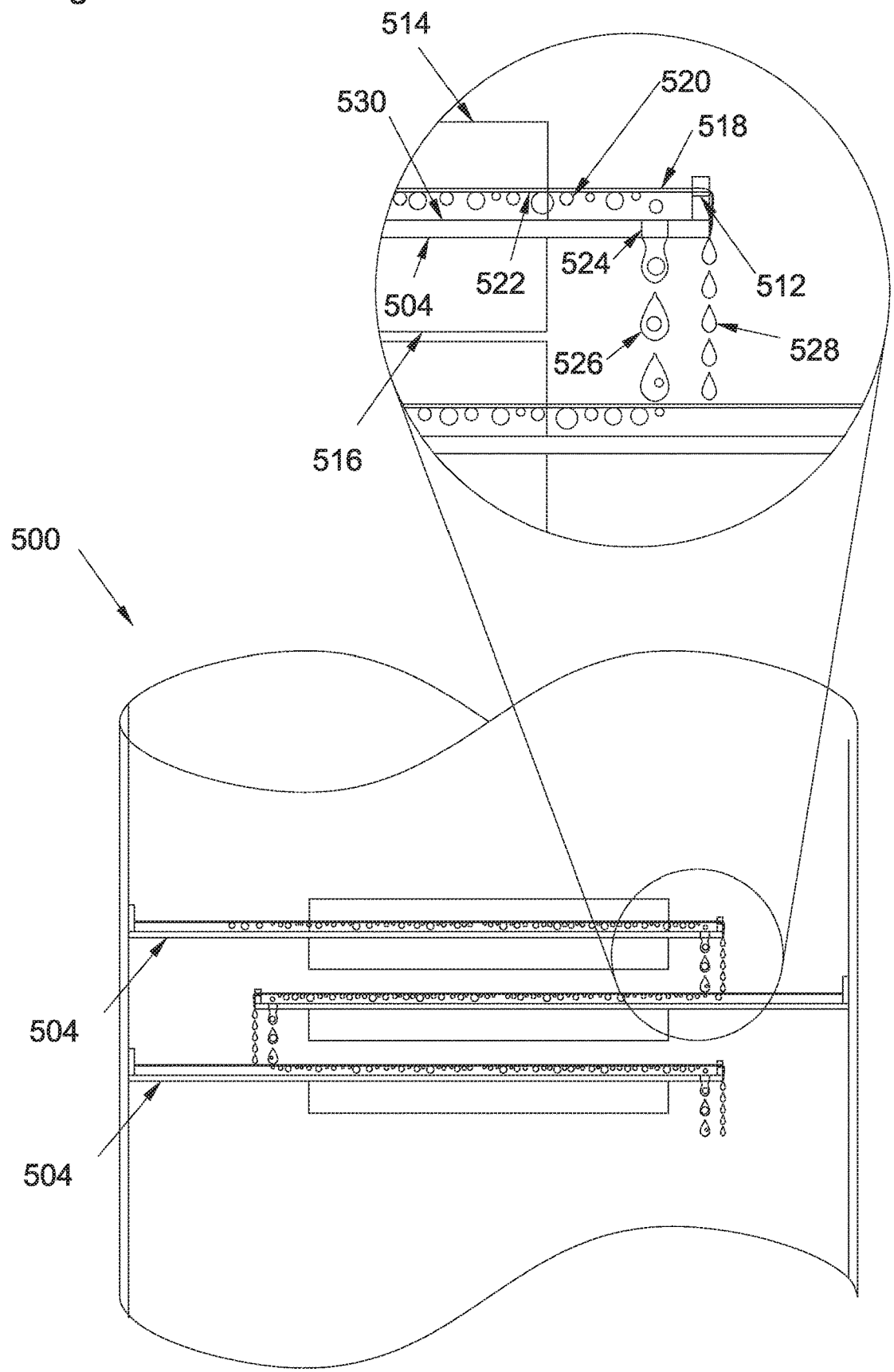
FIG. 16 is a zoomed-in view of the condenser of FIG. 15.
Figure 17:
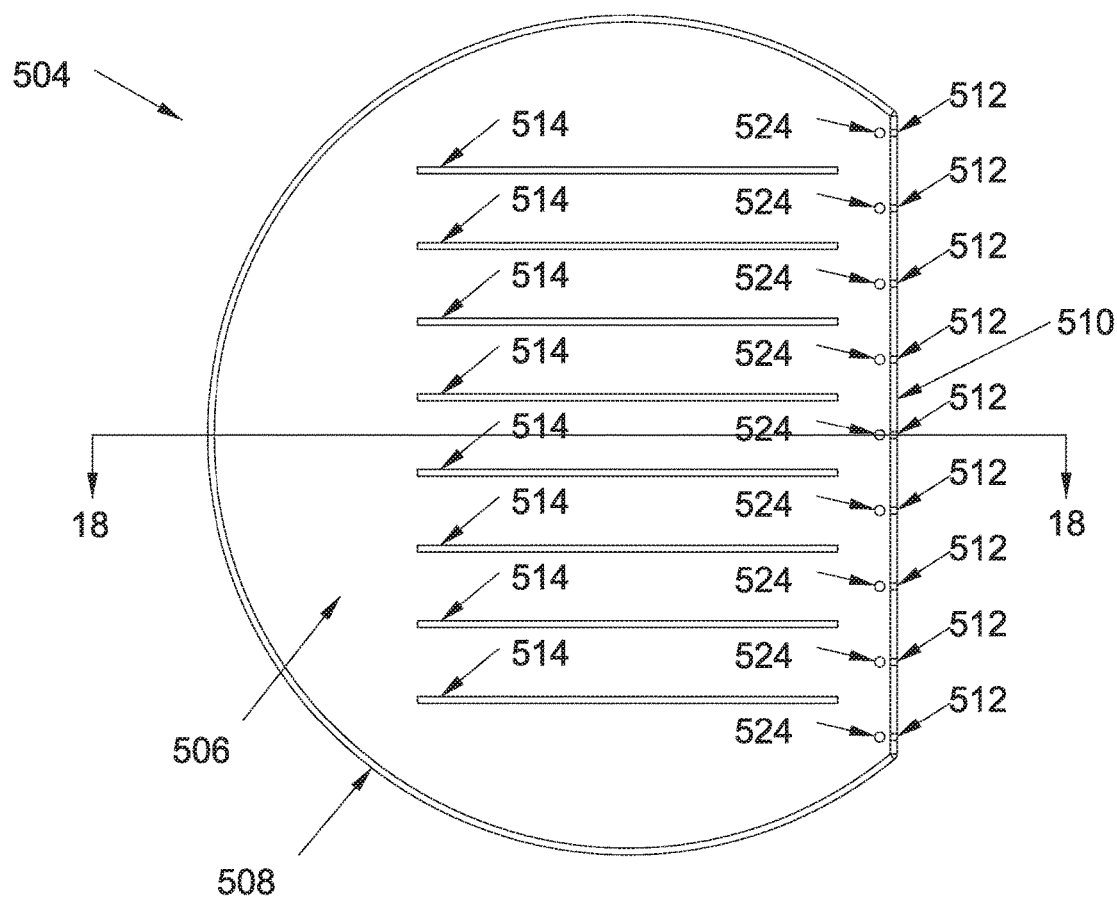
FIG. 17 is a top view of an embodiment of a baffle of the condenser of FIG. 15 in accordance with principles disclosed herein.
Figure 18:
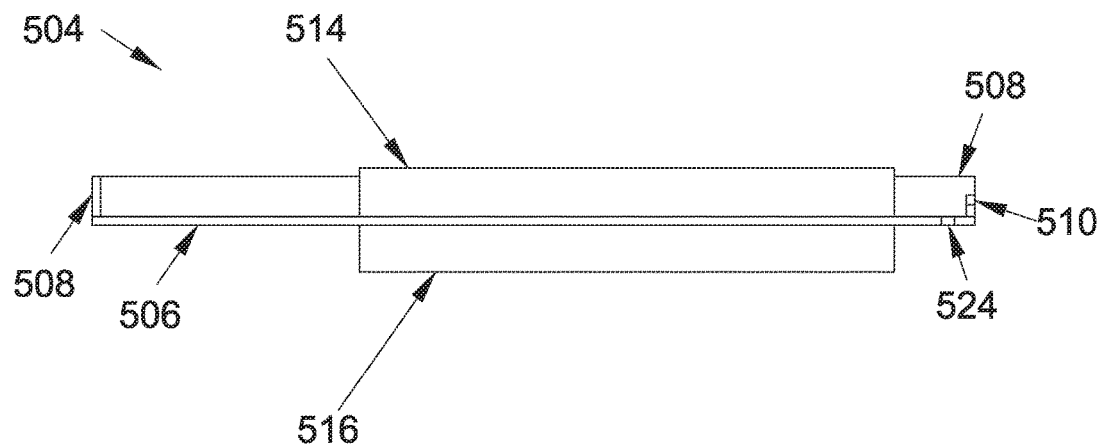
FIG. 18 is a cross-sectional view along line 18-18 of FIG. 17 of the baffle shown in FIG. 17.
Figure 19:
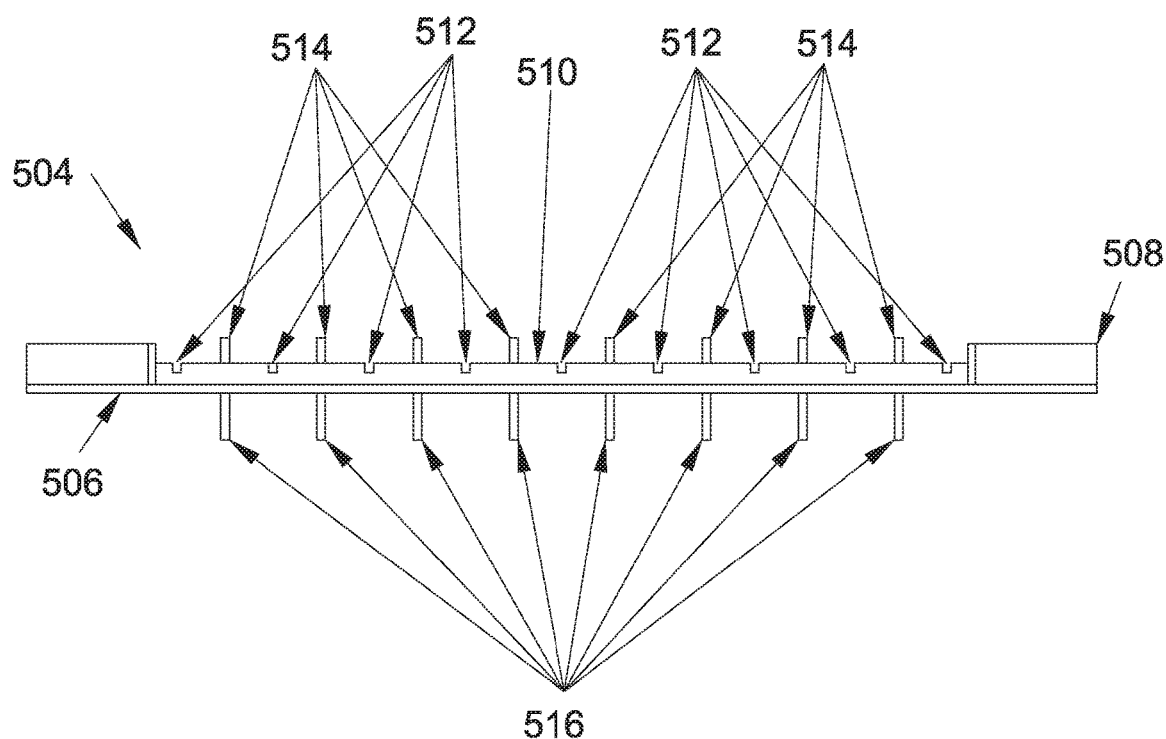
FIG. 19 is an end view of the baffle shown in FIG. 17.

Referring to FIGS. 1, 13, and 14, another embodiment of a condenser or melter 400 is shown in FIGS. 13 and 14. In some embodiments, condenser 400 may be used in the system 10 of FIG. 1 in lieu of the condenser 300 shown in FIGS. 8-10. Condenser 400 is generally configured to provide energy efficiency improvement through lower compressor back-pressure relative to condenser 300 while being of larger size/volume than condenser 300.

In the embodiment of FIGS. 1, 13, and 14, water/ice slurry is delivered from pump 100C through conduit 114 to condenser 400 at a slurry inlet or entry point 402, and compressed refrigerant is delivered from first stage compressor 200 through conduits 161 and 162 to condenser 400 at a refrigerant inlet or entry point 404. In this arrangement, the ice slurry drips through a plurality of axially spaced perforated baffles 406, where the slurry is prevented from pouring over the edge of each perforated baffle 406 by a curb 408 of each baffle 406. From the refrigerant entry point 404, refrigerant vapor flows along a serpentine flow path up through the plural baffles 406, thereby contacting the water/ice slurry dripping downward through condenser 400. Heat is thereby transferred from the vapor to the water/ice slurry, causing the vapor to condense into a liquid, and transferring the heat from the slurry to the ice crystals, causing the ice crystals to melt. Water formed from the melted ice and liquid refrigerant collects in a sump 410 located at the bottom of condenser 400. Additionally, the collected liquid refrigerant 412 is drawn out of condenser 400 at a refrigerant outlet or exit point 414, while the collected water is drawn out of condenser 400 at a water outlet or exit point 416.

The separation and draw-off of water and liquid refrigerant from condenser 400 generally follows the same principles as those described for the condenser 300 shown in FIGS. 8-10. In some embodiments, water is discharged through a conduit 440 to a riser 441, thereby maintaining the level of the liquid refrigerant in condenser 400 at the correct elevation for discharge through outlet 414. A portion of the water discharged to riser 441 spills over a weir located at the top of riser 441, thereby maintaining head in condenser 400 at elevation 442. The water then flows into a collection reservoir 444, and thence is discharged through water outlet 416 to conduit 135 of system 10.

Referring to FIGS. 1 and 15-19, another embodiment of a condenser or melter 500 is shown in FIGS. 15-19. Condenser 500 may be used in the system 10 of FIG. 1 in lieu of the condenser 300 shown in FIGS. 8-10. In the embodiment of FIGS. 1 and 15-19, a water/ice slurry with approximately 10% ice by weight is introduced to condenser 500 through a slurry entry point 502 near the top of condenser 500. The ice/water slurry cascades down through a plurality of axially spaced baffles 504 disposed in condenser 500, flowing on a first or upper baffle 504 of the plurality of baffles 504 from left to right (relative to the position of condenser 500 shown in FIG. 15), dropping from the end of the upper baffle 504 to a second baffle 504 disposed directly adjacent or beneath the upper baffle 504, then flowing from right to left (relative to the position of condenser 500 shown in FIG. 15), and so on until the ice/water slurry drops off a final or lower baffle 504 of the plurality of baffles 504 and flows towards the bottom of condenser 500. Additionally, in this embodiment, compressed refrigerant vapor is admitted into the bottom of condenser 500 through a refrigerant entry point 503, and flows upward through the baffles 504 in serpentine fashion towards the top of condenser 500. In this embodiment, each baffle 504 of condenser 500 includes a baffle plate 506, a baffle skirt 508, and a weir plate 510 that includes a plurality of spaced, notched weirs 512. Further in this embodiment, each baffle 504 of condenser 500 is outfitted with a plurality of top fins 514 and a plurality of bottom fins 516 to promote heat transfer between the refrigerant and ice/water slurry flowing through condenser 500.

Particularly, as the ice/water slurry cascades down condenser 500 through the baffles 504, heat is transferred from the refrigerant vapor to the ice/water slurry, causing at least some of the ice in the ice/water slurry to melt. Thus, the stream which enters condenser 500 as ice/water slurry exits as substantially or entirely water. Additionally, the heat transfer from the refrigerant vapor causes the vapor to condense into a liquid. In this manner, the liquid refrigerant becomes part of the slurry/water stream. Because of the immiscibility of the refrigerant with water, and the density of the refrigerant being less than the density of the water and ice, the liquid refrigerant flows on top of the slurry/water as a relatively thin film 518 (shown in FIG. 16).

In this embodiment, as the ice/water slurry descends onto each baffle 504 at one end, ice particles 520 (shown in FIG. 16) float to a water surface 522. The water and ice flow to the opposite end of each baffle 504 of condenser 500, where most of the water is discharged through drain holes 524 and carries the ice particles 520 floating near the surface 522 through the drain holes 524 to the next-lower baffle 504 in a stream 526. In some embodiments, the number of drain holes 524, the size of each drain hole 524, and the flow rate of the slurry/water stream 526 are configured to provide a small stream of excess water 528 over the notched weirs 512 disposed in each baffle 504. In this way, sufficient water level is provided to ensure floatation of the ice particles 520, so that the particles 520 do not become impeded by dragging on a top surface 530 of the baffle plate 506 of each baffle 504. At the same time, the water is prevented from becoming so deep that ice particles 520 fail to be drawn through the drain holes 524 with the discharged water. During transient operations (i.e., start-up), recirculation through pump 100C in FIG. 1 may be employed to maintain a minimum flow rate of the slurry/water stream 526, ensuring that a sufficient water level is maintained. Additionally, as the water flows over the notched weirs 512 of each baffle 504, the aforementioned film of liquid refrigerant 518 is carried with it.

In some embodiments, most heat is transferred from the refrigerant vapor, through the fins 514 and 516, and then through the baffle plate 506 to the ice/water slurry. However, some heat may be transferred directly from the refrigerant vapor to the ice/water slurry. The refrigerant vapor that condenses (due to the transfer of heat therefrom) on the fins accumulates and is transported via gravity to the slurry/water. In this embodiment, there is no through-flow of refrigerant through the baffles 504 of condenser 500. All refrigerant vapor entering condenser 500 is condensed, and carried by the slurry/water to the bottom of condenser 500. Liquid refrigerant 532 is separated from water 534 by gravity, and discharged at a discharge point 536 of condenser 500. Additionally, water 534 is discharged at a discharge point 538 of condenser 500. Further, an arrangement similar to that used for condenser 300 and condenser 400 may be used with condenser 500 to maintain water and liquid refrigerant at the required elevations, but for conciseness is not shown.

Figure 20:
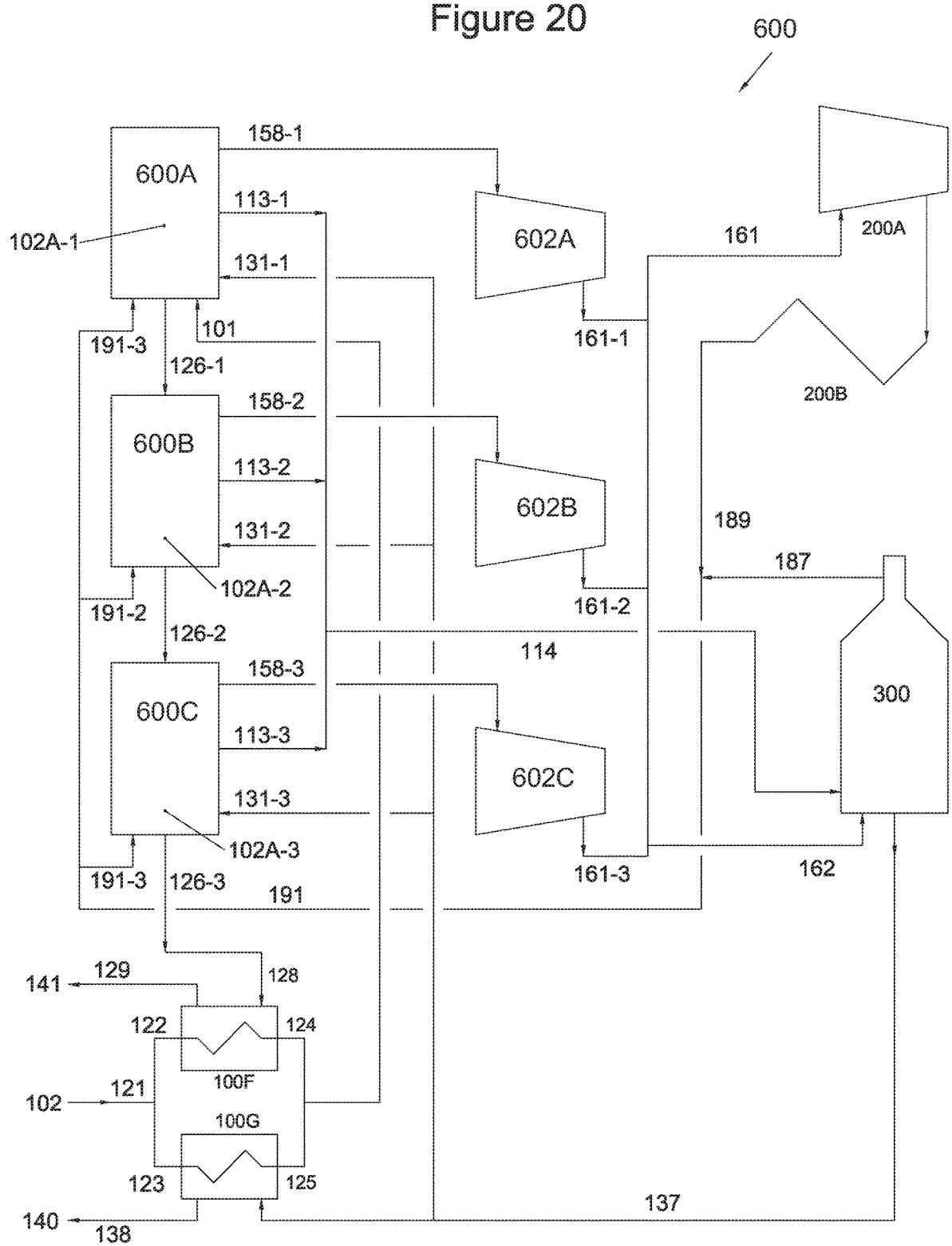
FIG. 20 is a schematic illustration of another embodiment of a system for separating a soluble solution in accordance with principles disclosed herein.

Referring to FIG. 20, another embodiment of a system 600 for separating soluble solutions is shown. System 600 includes features in common with system 10 shown in FIG. 1, and shared features are labeled similarly. System 600, the embodiment illustrated in FIG. 20, is for conciseness, comprised of elements consolidated and extracted from the system 10 embodiment illustrated in FIG. 1. In the embodiment of FIG. 20, system 600 includes three freezer units 600A-600C, where each freezer unit 600A-600C includes freezer 100, separator 100A, ice washer 1006, pump 100C, centrifugal separator 100D, and heat exchanger 100E of system 10. In other words, system 600 includes three freezers 100 (one freezer 100 for each freezer unit 600A-600C), three separators 100A (one separator 100A for each freezer unit 600A-600C), etc. Although not shown in FIG. 20, system 600 includes reservoir 200C and reservoir 300A, which are configured similarly as in system 10. For conciseness, the valves of system 600 are not shown in FIG. 20, though they are included in system 600 and are configured similarly as system 10.

In this embodiment, the freezer 100 of each freezer unit 600A-600C operates at a different from pressure level, with the liquid solution discharged from each operating pressure level cascading to the next lower operating pressure level. At the lowest operating pressure level, the liquid solution discharged is the concentrate effluent stream 141. Particularly, system 600 comprises three operating pressure levels. In this embodiment, the freezer 100 of each freezer unit 600A-600C is paired with its own first stage compressor: freezer 100 of freezer unit 600A is paired with a first stage compressor 602A, freezer 100 of freezer unit 600B is paired with a first stage compressor 602B, and freezer 100 of freezer unit 600C is paired with a first stage compressor 602C. The freezer 100 of freezer unit 600A operates at a higher operating temperature and pressure than the freezer 100 of freezer unit 600B, and the freezer 100 of freezer unit 600B likewise operates at a higher temperature and pressure than the freezer 100 of freezer unit 600C. The embodiment of system 600 has three operating pressure levels. In this embodiment, the discharge stream from each of the three first stage compressors 602A-602C is collected into a common conduit 161 and forwarded to either condenser 300 or second stage compressor 200A, in a manner similar to system 10 of FIG. 1. However, other embodiments my have any number of operating pressure levels. In other embodiments of system 600, multiple freezers at each operating pressure level may be connected to multiple compressors operating at that operating pressure level.

In this embodiment, conduit 101 supplies liquid solution 102A to the freezer 100 of freezer unit 600A, which extracts some ice from liquid solution 102A to form a first concentrate 102A-1. The ice extracted from liquid solution 102A is transported from the freezer 100 of freezer unit 600A to condenser 300 through conduits 113-1 and 114. The first concentrate 102A-1 then exits the freezer 100 of freezer unit 600A through conduit 126-1, and cascades down to the next lower pressure freezer 100 of freezer unit 600B, where it forms a second concentrate 102A-2 having a lower freezing temperature and a higher concentration than first concentrate 102A-1. Particularly, ice is extracted from first concentrate 102A-1 in the freezer 100 of freezer unit 600B and sent to condenser 300 through conduits 113-2 and 114. The second concentrate 102A-2 formed in the freezer 100 of freezer unit 600B flows through conduit 126-2 and forwarded to the freezer 100 of freezer unit 600C, where the process is repeated at a lower temperature and pressure. After extraction of ice in the freezer 100 of freezer unit 600C (forming a third concentrate 102A-3), the third concentrate 102A-3 is extracted from the freezer 100 of freezer unit 600C through conduit 128, and forwarded to heat exchanger 100F, where the third concentrate 102A-3 exchanges heat with a portion of the incoming feed 102, and then is discharged through conduit 129 as reject concentrate effluent 141, in a manner similar to system 10 of FIG. 1.

In some applications, utilizing multiple compressors in multiple-pressure freezing systems, as is done in system 600, may result in increased energy efficiency of the system 600. By way of an example, assume a single freezer and compressor that, like system 10 shown in FIG. 1, receives 1 kg of feed solution, freezes 67% of the water of the received solution, with the remaining 33% concentrate containing all of the solute. To do so, the single comparison freezer would operate at the same temperature and pressure of the example third stage freezer (i.e., freezer 100 of system 10); that is to say, it would freeze all of the ice at a temperature of approximately −6.9° C., and operate at a pressure of approximately 104.9 kilo-Pascals-absolute (kPaa). In this example, the example third stage freezer is handling a significantly smaller quantity of feed concentrate (approximately 0.5 kg) than the comparison freezer, which handles the full 1.0 kg. of feed solution in this example. Thus, the single comparison first stage compressor along with its second stage compressor are calculated to require approximately 39.9 kilo-Joules (kJ) of energy, while the three example first stage compressors combined, plus their second stage compressor, are calculated to require approximately 34.2 kJ of energy, a reduction of 14% in this example.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A system for separating a soluble solution, comprising:
  a first freezer configured to contact a liquid feed stream with a refrigerant stream to convert the liquid feed stream into a concentrated solution stream, a first plurality of ice crystals, and a second plurality of ice crystals that are larger than the first plurality of ice crystals, wherein the first freezer comprises:
    a first inlet in fluid communication with the liquid feed stream;
    a second inlet in fluid communication with the refrigerant stream;
    a first outlet positioned at an upper end of the first freezer;
    a second outlet positioned below the first outlet; and
    a port at the upper end of the first freezer;
  a first separator comprising:
    an inlet in fluid communication with the second outlet of the first freezer;
    a port; and
    an outlet positioned at a lower end of the first separator;
  a first ice washer comprising a first port, an outlet an inlet, and a second port at an upper end of the first ice washer; and
  a first conduit extending from the port of the first separator to the first port of the first ice washer;
  an overhead vent conduit extending from the second port at the upper end of the first ice washer to the port at the upper end of the first freezer, wherein the overhead vent conduit is in direct fluid communication with the first ice washer and the first freezer;
  a first flow path extending from the second outlet of the first freezer into the inlet of the first separator; through the first separator, the port of the first separator, and the first conduit into the first port of the first ice washer; and through the first ice washer into the outlet of the first ice washer;
  a second flow path extending from a condenser into the inlet of the first ice washer; through the first ice washer, the first port of the first ice washer, and the first conduit into the port of the first separator; through the first separator and the outlet of the first separator to the first freezer; wherein the first separator is positioned between the first ice washer and the first freezer along the second flow path;
  wherein the first flow path is configured to:
    transport the concentrated solution stream, the first plurality of ice crystal, and the second plurality of ice crystals from the first freezer to the first separator; and
    transport the second plurality of ice crystals from the first separator through the first conduit to the outlet of the first ice washer;

wherein the second flow path is configured to:
transport a supply of fresh water from the condenser to the inlet of the first ice washer; and
transport the concentrated solution stream and the first plurality of ice crystals from the first separator to the first freezer;
wherein the first conduit is configured to flow the fresh water from the first port of the first ice washer to the port of the first separator along the second flow path and flow the second plurality of ice crystals from the port of the first separator to the first port of the first ice washer along the first flow path.

2. The system of claim 1, wherein the first ice washer is configured to mix the second plurality of ice crystals with the fresh water provided to the first ice washer separately from the second plurality of ice crystals to form a slurry of water and ice and whereby the second plurality of ice crystals float upwardly through a volume of the fresh water within the first ice washer.

3. The system of claim 1, further comprising:
a compressor configured to pressurize a refrigerant overhead stream discharged from the first outlet of the first freezer;
wherein the condenser is configured to receive a stream of water and ice slurry discharged from the outlet of the first ice washer and the refrigerant overhead stream from the compressor, wherein the condenser comprises a slurry distribution grid and a refrigerant distribution grid, wherein the refrigerant distribution grid is disposed above the slurry distribution grid, and wherein a perforated plate is disposed between the refrigerant distribution grid and the slurry distribution grid;
wherein the slurry distribution grid, the refrigerant distribution grid, and the perforated plate are configured to mix the refrigerant overhead stream and the stream of water and ice slurry to condense the refrigerant stream and melt the ice in the stream of water and ice slurry.

4. The system of claim 1, further comprising:
a compressor configured to pressurize a refrigerant overhead stream discharged from the first outlet of the first freezer;
wherein the condenser is configured to receive a stream of water and ice slurry from the outlet of the first ice washer and the refrigerant overhead stream from the compressor;
wherein the condenser comprises a plurality of baffles configured to direct the refrigerant overhead stream upward through the condenser along a serpentine path, direct the stream of water and ice slurry downward through perforations formed in the baffles, and bring the refrigerant overhead stream into contact with the stream of water and ice slurry to exchange heat and condense the refrigerant stream and melt the ice in the stream of water and ice slurry.

5. The system of claim 1, further comprising:
a compressor configured to pressurize a refrigerant overhead stream discharged from the first outlet of the first freezer;
wherein the condenser is configured to receive a stream of water and ice slurry from the outlet of the first ice washer and the refrigerant overhead stream from the compressor;
wherein the condenser comprises a plurality of baffles configured to direct the refrigerant overhead stream upward through the condenser along a serpentine path, direct the stream of water and ice slurry downward through the condenser along a serpentine path, and bring the refrigerant stream into contact with the stream of water and ice slurry stream to exchange heat and condense the refrigerant overhead stream and melt the ice in the stream of water and ice slurry.

6. The system of claim 1, further comprising:
a first compressor configured to pressurize a refrigerant overhead stream discharged from the first outlet of the first freezer to produce a first pressurized refrigerant stream;
wherein the condenser is configured to receive a stream of water and ice slurry from the outlet of the first ice washer and the first pressurized refrigerant stream from the first compressor, wherein the condenser is configured to mix a first portion of the first pressurized refrigerant stream and the stream of water and ice slurry to condense the first pressurized refrigerant stream and melt the ice in the stream of the water and ice slurry;
a second compressor configured to receive the first pressurized refrigerant stream from the first compressor, wherein the second compressor is configured to further pressurize a second portion of the first pressurized refrigerant stream sufficiently to condense the first pressurized refrigerant stream through heat exchange with an ambient environment and produce a second pressurized refrigerant stream; and
a first heat exchanger configured to exchange heat between the second pressurized refrigerant stream received from the second compressor and the ambient environment.

7. The system of claim 6, further comprising:
a second heat exchanger configured to exchange heat between the liquid feed stream and a reject concentrate stream discharged from the first freezer; and
a third heat exchanger configured to exchange heat between the liquid feed stream and a water stream discharged from the condenser;
a fourth heat exchanger configured to exchange heat between the reject concentrate stream received from the second heat exchanger and a portion of the second pressurized refrigerant stream received from the first heat exchanger to condense the second pressurized refrigerant stream; and
a fifth heat exchanger configured to exchange heat between the water stream received from the third heat exchanger and a portion of the second pressurized refrigerant stream received from the first heat exchanger, and condense the second pressurized refrigerant stream.

8. The system of claim 1, wherein:
the first freezer, the first separator, and the first ice washer comprise a first freezer unit;
the system comprises a second freezer unit comprising a second freezer, a second separator, and a second ice washer, the second freezer unit configured to receive the concentrated solution stream from the first freezer unit; and
the second freezer is configured to operate at a lower pressure than the first freezer.

9. A system for separating a soluble solution, comprising:
a first freezer configured to receive a liquid feed stream and a refrigerant stream, and discharge a concentrated solution stream, wherein the first freezer is configured to exchange heat between the liquid feed stream and the refrigerant stream through direct contact within the first freezer and freeze a portion of the liquid feed stream;

a first separator external to the first freezer and configured to separate ice crystals from the concentrated solution stream and recirculate the concentrated solution stream to the first freezer;

a first ice washer coupled to the first separator and configured to receive the ice crystals separated from the concentrated solution stream by the first separator and wash the separated ice crystals to free the ice crystals from contaminants;

a first compressor configured to pressurize a refrigerant overhead stream discharged from the first freezer to produce a first pressurized refrigerant stream;

a condenser configured to receive a stream of water and ice slurry from the first ice washer and the first pressurized refrigerant stream from the first compressor, wherein the condenser is configured to mix the first pressurized refrigerant stream and the water and ice slurry stream to condense the first pressurized refrigerant stream and melt ice crystals of the water and ice slurry stream;

a second compressor configured to receive the first pressurized refrigerant stream from the first compressor, wherein the second compressor is configured to further pressurize the first pressurized refrigerant stream sufficiently to condense the first pressurized refrigerant stream through heat exchange with an ambient environment and produce a second pressurized refrigerant stream;

a first heat exchanger configured to exchange heat between the second pressurized refrigerant stream received from the second compressor and the ambient environment a second heat exchanger configured to exchange heat between the liquid feed stream and a reject concentrate stream discharged from the first freezer;

a third heat exchanger configured to exchange heat between the liquid feed stream and a water stream discharged from the condenser; and a fourth heat exchanger configured to exchange heat between the reject concentrate stream received from the second heat exchanger and a portion of the second pressurized refrigerant stream received from the first heat exchanger to condense the second pressurized refrigerant stream.

10. The system of claim 9, further comprising a fifth heat exchanger configured to exchange heat between the water stream received from the third heat exchanger and a portion of the second pressurized refrigerant stream received from the first heat exchanger, and condense the second pressurized refrigerant stream.

11. The system of claim 9, further comprising a gas lift pump coupled between the first separator and the first freezer and configured to apply motive force for recirculating the concentrated solution stream from the first separator to the first freezer.

12. A system for separating a soluble solution, comprising:

a first freezer configured to contact a liquid feed stream with a refrigerant stream to convert the liquid feed stream into a concentrated solution stream, a first plurality of ice crystals, and a second plurality of ice crystals that are larger than the first plurality of ice crystals, wherein the first freezer comprises:

a first inlet in fluid communication with the liquid feed stream;

a second inlet in fluid communication with the refrigerant stream;

a first outlet positioned at an upper end of the first freezer; and a second outlet positioned below the first outlet;

a first separator comprising:

an inlet in fluid communication with the second outlet of the first freezer;

a port positioned at an upper end of the first separator; and an outlet positioned at a lower end of the first separator;

a first ice washer comprising a first port at a lower end of the first ice washer, an outlet, and an inlet;

a first conduit extending vertically from the port at the upper end of the first separator to the first port at the lower end of the first ice washer;

a first flow path extending from the second outlet of the first freezer into the inlet of the first separator; through the first separator, the port of the first separator, and the first conduit into the first port of the first ice washer; and through the first ice washer into the outlet of the first ice washer;

a second flow path extending from a condenser into the inlet of the first ice washer; through the first ice washer, the first port of the first ice washer, and the first conduit into the port of the first separator; through the first separator and into the outlet of the first separator; and from the outlet of the first separator to the first freezer, wherein the first separator is positioned between the first ice washer and the first freezer along the second flow path;

wherein the first flow path is configured to:

transport the concentrated solution stream, the first plurality of ice crystal, and the second plurality of ice crystals from the first freezer to the first separator; and transport the second plurality of ice crystals from the first separator through the first conduit to the outlet of the first ice washer;

wherein the second flow path is configured to:

transport a supply of fresh water from the condenser to the inlet of the first ice washer; and transport the concentrated solution stream and the first plurality of ice crystals from the first separator to the first freezer.

13. The system of claim 12, wherein the first separator comprises a plurality of vanes configured to provide a uniform velocity profile of the concentrated solution stream flowing through the first separator.

14. The system of claim 12, further comprising:

a compressor configured to pressurize a refrigerant overhead stream discharged from the first outlet of the first freezer; and a condenser configured to receive a stream of water and ice slurry from the outlet of the first ice washer and the refrigerant overhead stream from the compressor;

wherein the condenser comprises a plurality of baffles configured to direct the refrigerant overhead stream upward through the condenser along a serpentine path, direct the stream of water and ice slurry downward through the condenser along a serpentine path, and bring the refrigerant overhead stream into contact with the stream of water and ice slurry to exchange heat and condense the refrigerant overhead stream and melt the ice in the stream of water and ice slurry.

15. The system of claim 12, further comprising:
a first compressor configured to pressurize a refrigerant overhead stream discharged from the first outlet of the first freezer to produce a first pressurized refrigerant stream;
a condenser configured to receive a stream of water and ice slurry from the outlet of the first ice washer and the first pressurized refrigerant overhead stream from the first compressor, wherein the condenser is configured to mix the first pressurized refrigerant stream and the stream of water and ice slurry to condense the first pressurized refrigerant overhead stream and melt the ice in the stream of water and ice slurry;
a second compressor configured to receive the first pressurized refrigerant stream from the first compressor, wherein the second compressor is configured to further pressurize the first pressurized refrigerant stream sufficiently to condense the first pressurized refrigerant stream through heat exchange with an ambient environment and produce a second pressurized refrigerant stream; and
a first heat exchanger configured to exchange heat between the second pressurized refrigerant stream received from the second compressor and the ambient environment.

16. The system of claim 12, wherein the first conduit is configured to flow the second plurality of ice crystals from the port of the first separator to the first port of the first ice washer and flow the fresh water from the first port of the first ice washer to the port of the first separator.

17. The system of claim 12, wherein the flow of the first plurality of ice crystals comprises the fresh water from the first ice washer.

18. A system for separating a soluble solution, comprising:
a first freezer configured to contact a liquid feed stream with a refrigerant stream to convert the liquid feed stream into a concentrated solution stream, a first plurality of ice crystals, and a second plurality of ice crystals that are larger than the first plurality of ice crystals, wherein the first freezer comprises:
 a first inlet in fluid communication with the liquid feed stream;
 a second inlet in fluid communication with the refrigerant stream;
 a first outlet positioned at an upper end of the first freezer;
 a second outlet positioned below the first outlet; and
 a port at the upper end of the first freezer;
a first separator comprising:
 an inlet in fluid communication with the second outlet of the first freezer;
 a port; and
 an outlet positioned at a lower end of the first separator;
a first ice washer comprising a first port, an outlet, an inlet, and a second port at an upper end of the first ice washer; and
a first conduit extending from the port of the first separator to the first port of the first ice washer;
an overhead vent conduit extending from the second port at the upper end of the first ice washer to the port at the upper end of the first freezer, wherein the overhead vent conduit is in direct fluid communication with the first ice washer and the first freezer;
a first flow path extending from the second outlet of the first freezer into the inlet of the first separator; through the first separator, the port of the first separator, and the first conduit into the first port of the first ice washer; and through the first ice washer into the outlet of the first ice washer;
a second flow path extending from a condenser into the inlet of the first ice washer; through the first ice washer, the first port of the first ice washer, and the first conduit into the port of the first separator; through the first separator and the outlet of the first separator to the first freezer; wherein the first separator is positioned between the first ice washer and the first freezer along the second flow path;
wherein the first flow path is configured to:
 transport the concentrated solution stream, the first plurality of ice crystal, and the second plurality of ice crystals from the first freezer to the first separator; and
 transport the second plurality of ice crystals from the first separator through the first conduit to the outlet of the first ice washer;
wherein the second flow path is configured to:
 transport a supply of fresh water from the condenser to the inlet of the first ice washer; and
 transport the concentrated solution stream and the first plurality of ice crystals from the first separator to the first freezer;
a second conduit extending from the outlet of the first separator to a third inlet of the first freezer positioned below the second outlet of the first freezer; and
a valve positioned along the second conduit;
wherein the valve is configured to control the flow of the concentrated solution stream, the first plurality of ice crystals, and the second plurality of ice crystals in the first separator along the first flow path and the second flow path.

19. The system of claim 1, wherein the first port of the first ice washer is positioned above the port of the first separator.

20. The system of claim 1, wherein the first conduit has a width that is less than a width of the first separator and less than a width of the first ice washer.

21. The system of claim 1, wherein the inlet of the first ice washer is positioned above the first port of the first ice washer and below the outlet of the first ice washer.

22. The system of claim 1, wherein the first conduit includes an inlet positioned between the first separator and the first ice washer, wherein the inlet of the first conduit is in fluid communication with a refrigerant vapor stream.

23. The system of claim 12, wherein the first port of the first ice washer is positioned above the port of the first separator.

24. The system of claim 12, wherein the inlet of the first ice washer is positioned above the first port of the first ice washer and below the outlet of the first ice washer.

25. The system of claim 12, further comprising:
a second conduit extending from the outlet of the first separator to a third inlet of the first freezer positioned below the second outlet of the first freezer; and
a valve positioned along the second conduit;
wherein the valve is configured to control the flow of the concentrated solution stream, the first plurality of ice crystals, and the second plurality of ice crystals in the first separator along the first flow path and the second flow path.

26. The system of claim 12, further comprising an overhead vent conduit extending from a second port at an upper end of the first ice washer to a port at the upper end of the first freezer, wherein the overhead vent conduit is in direct fluid communication with the first ice washer and the first freezer.

27. The system of claim 12, wherein the first conduit includes an inlet positioned between the first separator and the first ice washer, wherein the inlet of the first conduit is in fluid communication with a refrigerant vapor stream.

28. The system of claim 1, further comprising:
a second conduit extending from the outlet of the first separator to a third inlet of the first freezer positioned below the second outlet of the first freezer; and
a valve positioned along the second conduit;
wherein the valve is configured to control the flow of the concentrated solution stream, the first plurality of ice crystals, and the second plurality of ice crystals in the first separator along the first flow path and the second flow path.

29. The system of claim 1, further comprising a perforated plate disposed in the first freezer and configured to disperse the refrigerant stream into droplets within the first freezer with a plurality of holes extending through the perforated plate, each hole comprising a first aperture having a first diameter and a second aperture having a second diameter that is less than the first diameter.

30. The system of claim 1, wherein the first separator comprises a plurality of vanes configured to provide a uniform velocity profile of the concentrated solution stream flowing through the first separator.

* * * * *